United States Patent
Ketterhagen

(10) Patent No.: US 6,561,396 B2
(45) Date of Patent: May 13, 2003

(54) AUTOMOBILE CARGO CARRIER SYSTEM

(75) Inventor: Casey A. Ketterhagen, Milwaukee, WI (US)

(73) Assignee: Johnson Outdoors Inc., Racine, WI (US)

( * ) Notice: Subject to any disclaimer, the term of this patent is extended or adjusted under 35 U.S.C. 154(b) by 0 days.

(21) Appl. No.: 09/792,252

(22) Filed: Feb. 23, 2001

(65) Prior Publication Data
US 2002/0117523 A1 Aug. 29, 2002

(51) Int. Cl.$^7$ ............................................. B60R 9/042
(52) U.S. Cl. ...................... 224/310; 224/324; 414/547; 414/680; 248/503
(58) Field of Search .............................. 224/310, 321, 224/324, 325; 414/462, 546, 547, 680; 248/503

(56) References Cited

U.S. PATENT DOCUMENTS

| | | | |
|---|---|---|---|
| 3,378,156 A | | 4/1968 | Hunton |
| 3,746,194 A | | 7/1973 | Koenig |
| 3,756,648 A | | 9/1973 | Greif |
| 4,081,118 A | * | 3/1978 | Mason ...................... 224/324 |
| 4,329,100 A | | 5/1982 | Golze |
| 4,449,656 A | | 5/1984 | Wouden |
| D297,631 S | | 9/1988 | Breger |
| 4,863,080 A | | 9/1989 | Graber |
| 4,877,169 A | | 10/1989 | Grim |
| 4,887,754 A | | 12/1989 | Boyer et al. |
| 5,092,504 A | | 3/1992 | Hannes et al. |
| 5,118,020 A | | 6/1992 | Piretti |
| 5,135,145 A | | 8/1992 | Hannes et al. |
| D332,243 S | | 1/1993 | Collins |
| 5,195,670 A | | 3/1993 | Piretti et al. |
| 5,211,323 A | | 5/1993 | Chimenti et al. |
| D337,980 S | | 8/1993 | Ng |
| D344,482 S | | 2/1994 | Arvidsson |
| 5,297,912 A | * | 3/1994 | Levi ........................... 414/462 |
| 5,316,192 A | | 5/1994 | Ng |
| 5,346,355 A | | 9/1994 | Riemer |

(List continued on next page.)

OTHER PUBLICATIONS

The Eide Automatic Boat Loader, printed from www.eide-boatloader.com, believed to be available at this website before Feb. 23, 2001 (14 pages).

Loadmaster Roof Rack Mounting System, printed from www.theloadmaster.com, believed to have been available at this website before Feb. 23, 2001 (9 pages).

Primary Examiner—Stephen K. Cronin
(74) Attorney, Agent, or Firm—Foley & Lardner

(57) ABSTRACT

A cargo carrier system includes at least one cargo carrier for use with a vehicle having a front, a rear, a first side, a second side and roof rack. The carrier includes a base adapted to be coupled to the roof rack and a cargo holder coupled to the base. In one exemplary embodiment, the base is pivotably coupled to the roof rack about an axis extending parallel to the first side. In one exemplary embodiment, the cargo holder is coupled to the base by a first link having a first end pivotably coupled to the base about an axis extending parallel to the first side and a second end pivotably coupled to the holder about an axis extending parallel to the first side. In another exemplary embodiment, the cargo holder is also coupled to the base by a second link having a first end pivotably coupled to the base about an axis extending parallel to the first side and a second end pivotably coupled to the holder about an axis extending parallel to the first side. According to one preferred embodiment, the cargo holder includes a rigid arm having an arcuate portion configured to receive an elongate watercraft, a flexible support coupled to the arm such that an intermediate portion of the support is spaced above the arm and supports the elongate watercraft at a distance spaced above the arm, and an elongate flexible member coupled to the arm such that the watercraft is sandwiched between the flexible member and the flexible support.

66 Claims, 11 Drawing Sheets

U.S. PATENT DOCUMENTS

| | | |
|---|---|---|
| 5,360,150 A | 11/1994 | Praz |
| 5,360,151 A | 11/1994 | Fine |
| 5,363,996 A | 11/1994 | Raaber et al. |
| 5,366,195 A | 11/1994 | Arvidsson |
| 5,398,778 A | 3/1995 | Sexton |
| 5,505,357 A | 4/1996 | Chimenti et al. |
| 5,516,017 A | 5/1996 | Arvidsson |
| 5,524,803 A | 6/1996 | Arvidsson |
| 5,527,146 A * | 6/1996 | Allsop et al. ............... 224/319 |
| D374,209 S | 10/1996 | Lundgren |
| 5,560,525 A | 10/1996 | Grohmann et al. |
| D378,289 S | 3/1997 | Lundgren |
| 5,685,686 A | 11/1997 | Burns |
| 5,752,638 A * | 5/1998 | Meeks ....................... 211/70.5 |
| 5,775,557 A | 7/1998 | Arvidsson |
| 5,806,735 A | 9/1998 | Christiansson et al. |
| 5,826,767 A | 10/1998 | Chimenti et al. |
| 5,827,036 A | 10/1998 | Steffes et al. |
| 5,845,828 A | 12/1998 | Settelmayer |
| 5,850,891 A | 12/1998 | Olms et al. |
| 5,884,824 A | 3/1999 | Spring, Jr. |
| D412,882 S | 8/1999 | Lundgren |
| 5,931,362 A | 8/1999 | Chimenti |
| 5,951,231 A | 9/1999 | Allen |
| D416,855 S | 11/1999 | Englander |
| 6,000,593 A | 12/1999 | Chimenti |
| 6,010,048 A | 1/2000 | Settelmayer |
| 6,015,074 A | 1/2000 | Snavely et al. |
| D422,553 S | 4/2000 | VonDuyke |
| 6,085,954 A | 7/2000 | Bloemer et al. |
| 6,092,972 A * | 7/2000 | Levi .......................... 224/310 |
| 6,131,781 A | 10/2000 | Murray |
| 6,164,507 A | 12/2000 | Dean et al. |
| 6,179,543 B1 * | 1/2001 | Adame et al. ............... 224/310 |
| 6,360,930 B1 * | 3/2002 | Flickenger ................ 118/314 |
| 6,427,889 B1 * | 8/2002 | Levi .......................... 224/315 |
| 6,428,263 B1 * | 8/2002 | Schellens .................... 414/462 |

* cited by examiner

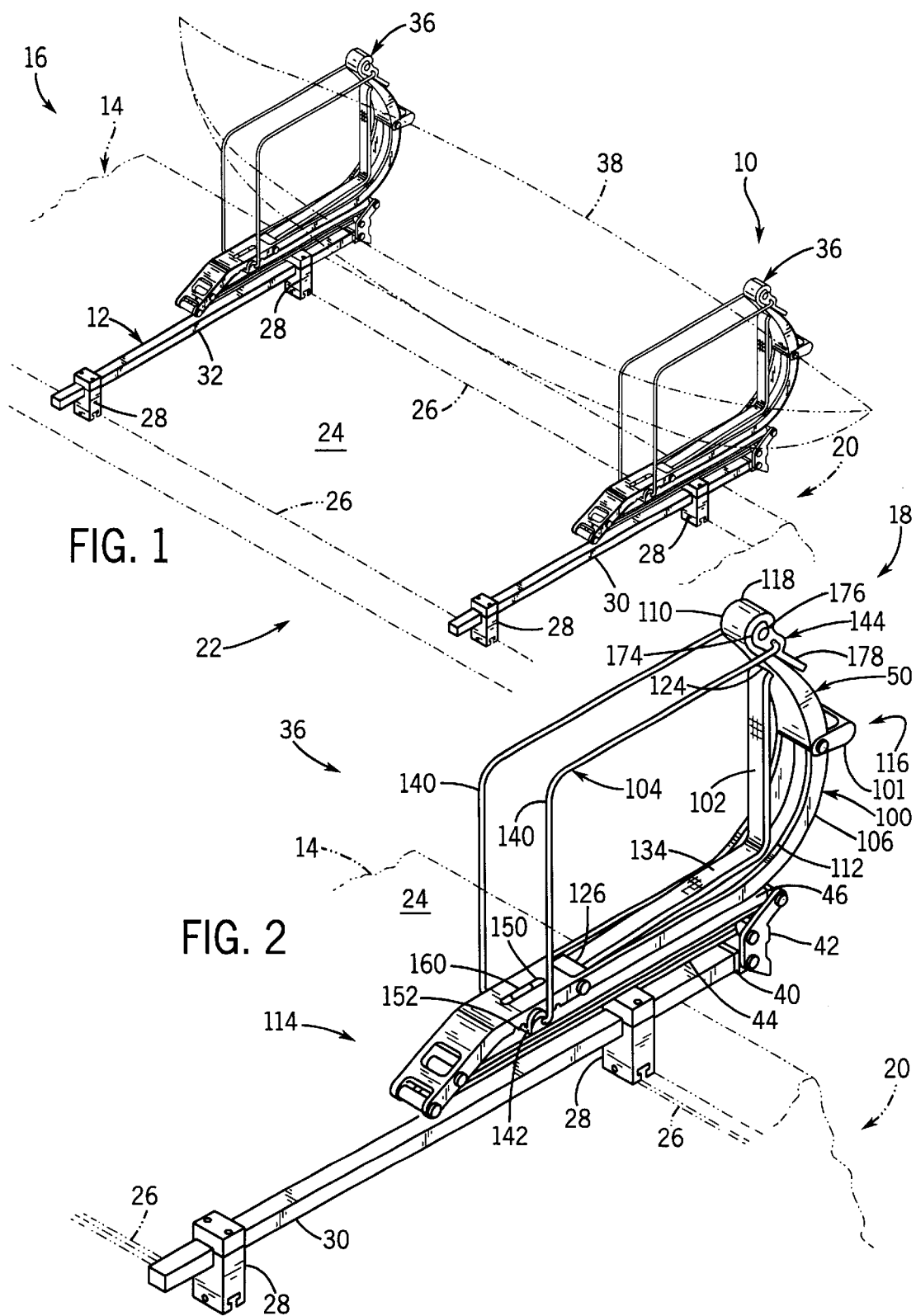

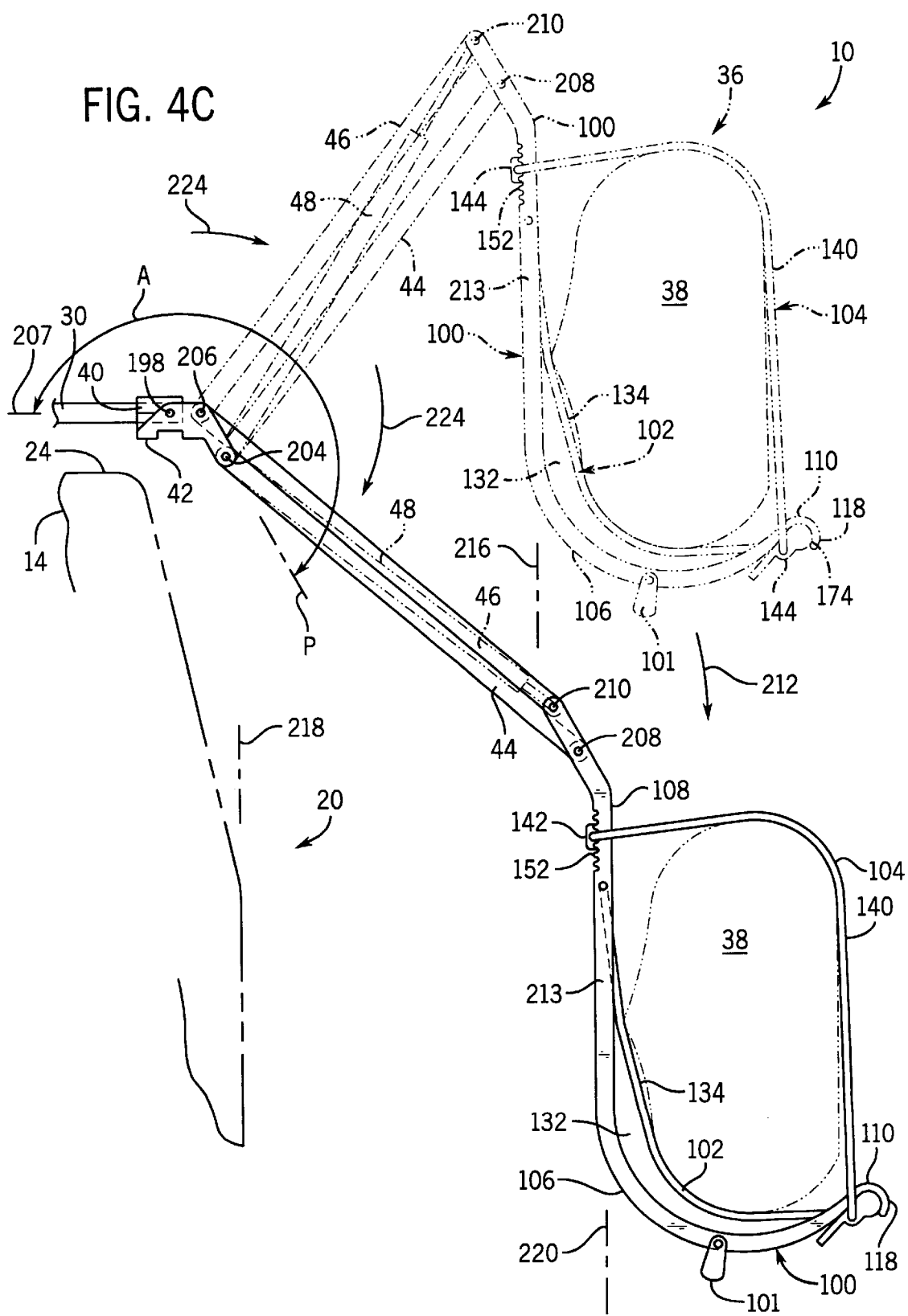

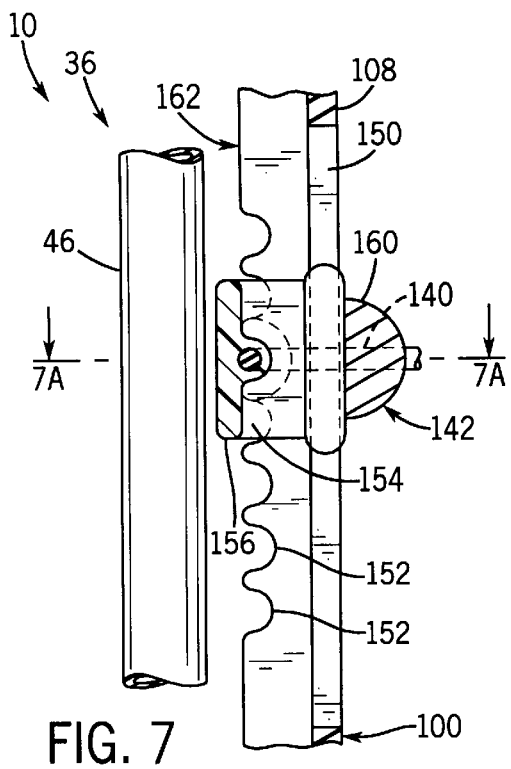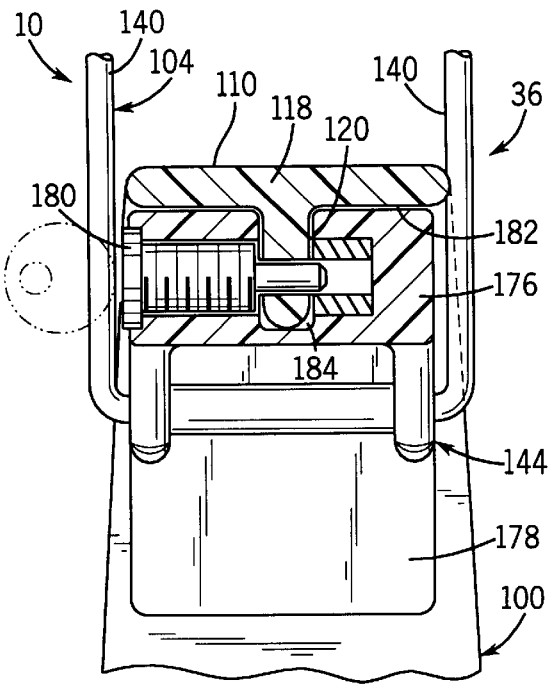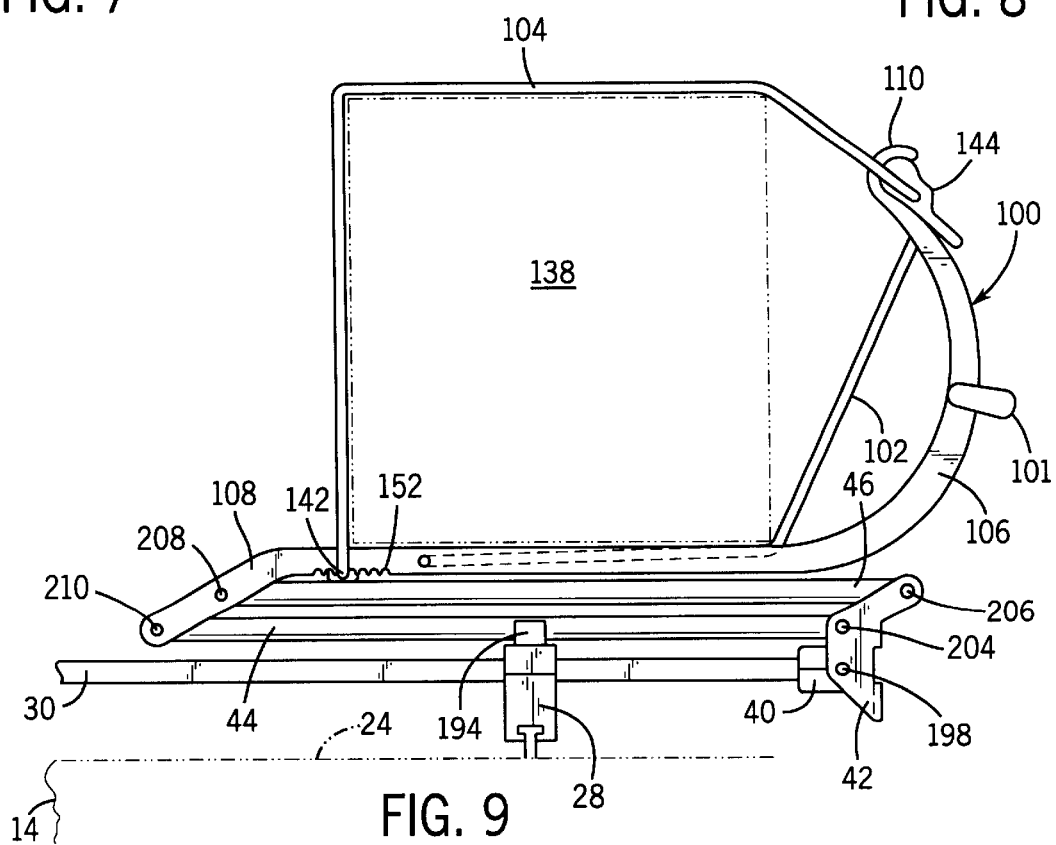

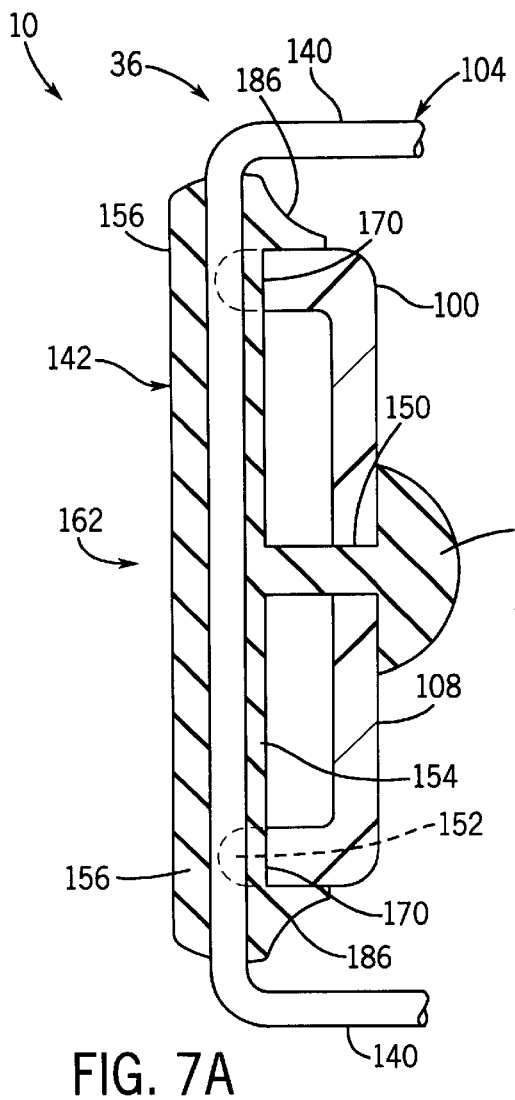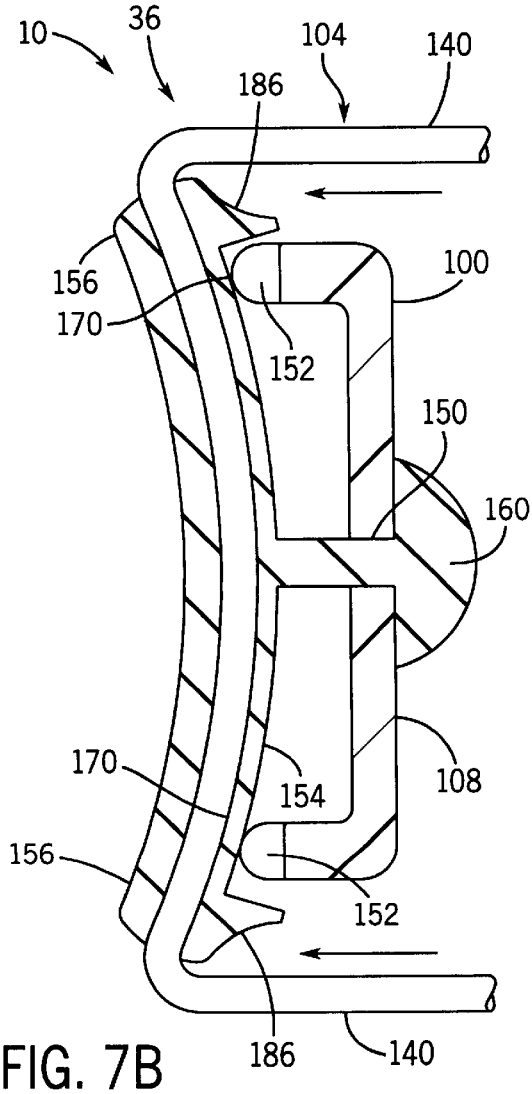
FIG. 7A
FIG. 7B

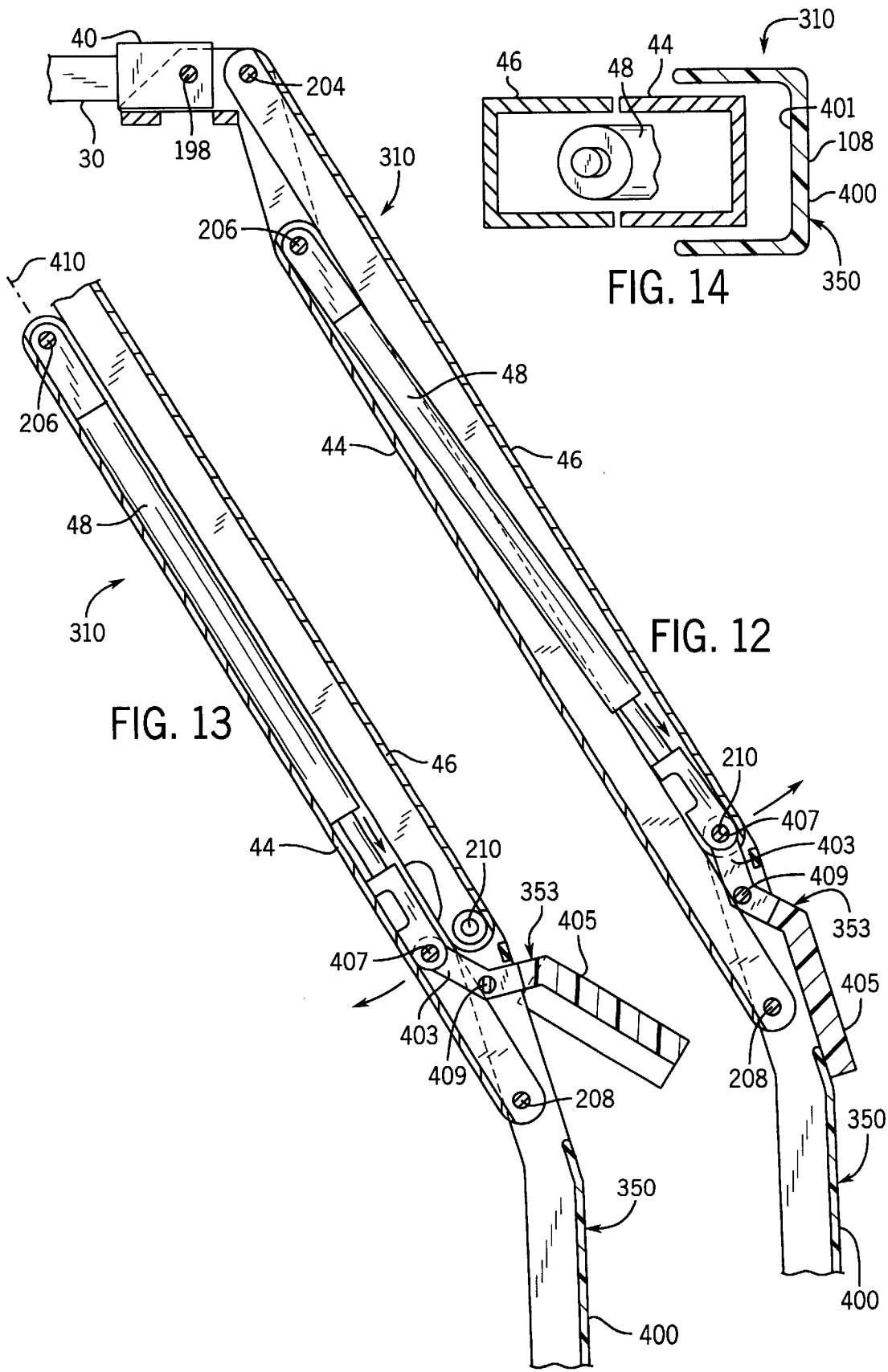

AUTOMOBILE CARGO CARRIER SYSTEM

FIELD OF THE INVENTION

The present invention relates to vehicle roof racks and accessories. In particular, the present invention relates to a cargo carrier system for carrying and supporting cargo on a vehicle roof rack.

BACKGROUND OF THE INVENTION

Many of today's vehicles are equipped with roof racks for stowing cargo. Such roof racks typically include feet or towers that are mounted to the roof of the vehicle and that support a plurality of transversely extending load beams. The load beams typically support cargo above the roof of the vehicle and provide structures for tying down and securing the cargo.

Although providing a basic structure for supporting cargo upon the roof of the vehicle, such roof racks are not well suited for supporting elongate, irregularly shaped cargo, such as various watercraft, surfboards, ski equipment and the like. In particular, securely mounting such elongate cargo to and upon the transverse load beams is difficult. Moreover, the elongate cargo is susceptible to shifting and possible damage. As a result, various specialized brackets and mounting arrangements have been developed for more securely supporting and holding such elongate cargo upon a roof rack. Examples of such mounting arrangements are found in U.S. Pat. No. 5,516,017 and U.S. Pat. No. 5,951,231. Although such mounting arrangements facilitate more reliable mounting of elongate cargo upon the roof of the vehicle, such arrangements only minimally conform to the contour of the elongate cargo being stowed and are difficult to load with the elongated cargo.

Another problem associated with merely using a conventional roof rack or the aforementioned mounting arrangements to support the elongated cargo is the extremely difficult task of loading or unloading elongated cargo onto or off of the roof rack or mounting arrangement. Because such elongated cargo is frequently heavy or extremely awkward to handle, maneuvering and positioning such elongated cargo onto the roof rack or onto the roof-mounting arrangement on top of the roof rack is tedious, time consuming and prone to mistakes. In an attempt to provide easier loading and unloading of elongated cargo onto and off of a vehicle roof rack, a multitude of loading arrangements have been developed. Examples of such loading arrangements are disclosed in U.S. Pat. Nos. 5,884,824; 3,756,648; 3,746,194; 3,338,156; 4,329,100; 5,346,355; 5,360,151; 5,850,891; 5,398,778; and 5,360,150. Such known loading arrangements are extremely complex, difficult to manipulate and difficult to mount to an existing roof rack.

Thus, there is a continuing need for a cargo carrier system that more securely mounts elongate cargo to an existing vehicle roof rack irregardless of the precise shape or contours of the elongate cargo. There is also a continuing need for a cargo carrier system that is simple, easy to mount to an existing roof rack and that is easy to shift or manipulate for loading and unloading cargo, including elongate cargo such as watercraft, skis and surfboards.

SUMMARY OF THE INVENTION

According to one exemplary embodiment, a cargo carrier for use with a vehicle having a front, a rear, a first side, a second side and a roof rack is provided. The carrier includes a base adapted to be pivotably coupled to the roof rack about a first axis extending parallel to the first side, a cargo holder configured to be secured to cargo, a first link having a first end pivotably coupled to the base about a second axis extending parallel to the first axis and a second end pivotably coupled to the holder about a third axis extending parallel to the first axis, and a second link having a first end pivotably coupled to the base about a fourth axis extending parallel to the first axis and a second end pivotably coupled to the holder about a fifth axis extending parallel to the first axis.

According to another exemplary embodiment, a cargo carrier for use with a vehicle having a front, a rear, a first side, a second side and a roof rack is provided. The cargo carrier includes a base adapted to be mounted to the roof rack, a cargo holder configured to be secured to cargo, a first link having a first end pivotably coupled to the base about a first axis parallel to the first side and a second end pivotably coupled to the holder about a second axis extending parallel to the first axis and a second link having a first end pivotably coupled to the base about a third axis extending parallel to the first axis and a second end pivotably coupled to the holder about a fourth axis extending parallel to the first axis. The holder moves between a vertical raised position in which the holder extends above the base in a first plane and a vertical lowered position in which the holder extends at least partially below the base in a second plane parallel to or coextensive with the first plane.

According to yet another exemplary embodiment, a cargo carrier for use with a vehicle having a front, a rear, a first side, a second side and a roof rack is provided. The carrier includes a base adapted to be coupled to the roof rack, a cargo holder configured to be secured to cargo and a first link having a first end pivotably coupled to the base about a first axis extending parallel to the first side and a second end pivotably coupled to the holder about a second axis extending parallel to the first axis. The holder moves between a vertical raised position in which the holder extends above the base in a first plane and a vertical lowered position in which the holder extends at least partially below the base in a second plane parallel to or coextensive with the first plane.

According to yet another exemplary embodiment, a cargo carrier for use with a vehicle having a front, a rear, a first side, a second side and a roof is provided. The cargo carrier includes a cargo holder configured to be coupled to the roof rack. The cargo holder includes a rigid arm having an arcuate portion configured to receive an elongate watercraft, a flexible support and an elongate flexible member. The flexible support has a first portion, a second opposite portion and an intermediate portion between the first portion and the second portion. The first portion is coupled to a first side of the arcuate portion while the second portion is coupled to a second side of the arcuate portion. The intermediate portion is spaced above the arm and is adapted to support the elongate watercraft at a distance spaced above the arm such that a gap extends between the arm and the intermediate portion. The elongate flexible member has a first end and a second end. The first end is coupled to a first side of the arcuate portion while the second end is coupled to a second side of the arcuate portion. The flexible member and the flexible support are configured such that the elongate watercraft is sandwiched therebetween.

According to another exemplary embodiment, a cargo carrier for use with a vehicle having a front, a rear, a first side, a second side and a roof rack is provided. The cargo carrier includes a base adapted to be coupled to the roof rack, a cargo holder coupled to the base and configured to be secured to cargo, and a locking mechanism. The cargo holder is configured to move between a raised position and at least one lowered position. The cargo is biased towards the raised position. The locking mechanism is configured to releasably lock the cargo holder in the at least one lowered position.

BRIEF DESCRIPTION OF THE DRAWINGS

FIG. 1 is a top perspective view of a cargo carrier system including a plurality of carriers mounted to a roof rack of an underlying vehicle and holding an elongate cargo (shown in phantom).

FIG. 2 is an enlarged top perspective view of one of the carriers of FIG. 1.

FIG. 4C depicts the carrier of FIG. 4B being further repositioned to a further lowered loading position.

FIG. 7 is an enlarged fragmentary sectional view of the carrier of FIG. 4B taken along line 7—7.

FIG. 7A is a fragmentary sectional view of the carrier of FIG. 7 taken along line 7A—7A.

FIG. 7B illustrates the carrier of FIG. 7A repositioned to allow relative movement between an attachment and an arm of the carrier.

FIG. 8 is a fragmentary sectional view of a portion of an arm and hold down of the carrier of FIG. 2.

FIG. 9 is a side elevational view of the carrier of FIG. 4A supporting alternative elongate cargo.

FIG. 12 is a sectional view of the cargo carrier system of FIG. 10 with the cargo holder in a lowered position and with a locking mechanism in a released position.

FIG. 13 is a sectional view of the cargo carrier system of FIG. 10 with the cargo holder in the lowered position and with the locking mechanism in a locked position.

FIG. 14 is a sectional view of the cargo carrier system of FIG. 10 taken along line 14—14.

DETAILED DESCRIPTION OF THE PREFERRED EMBODIMENTS

Figure 3:
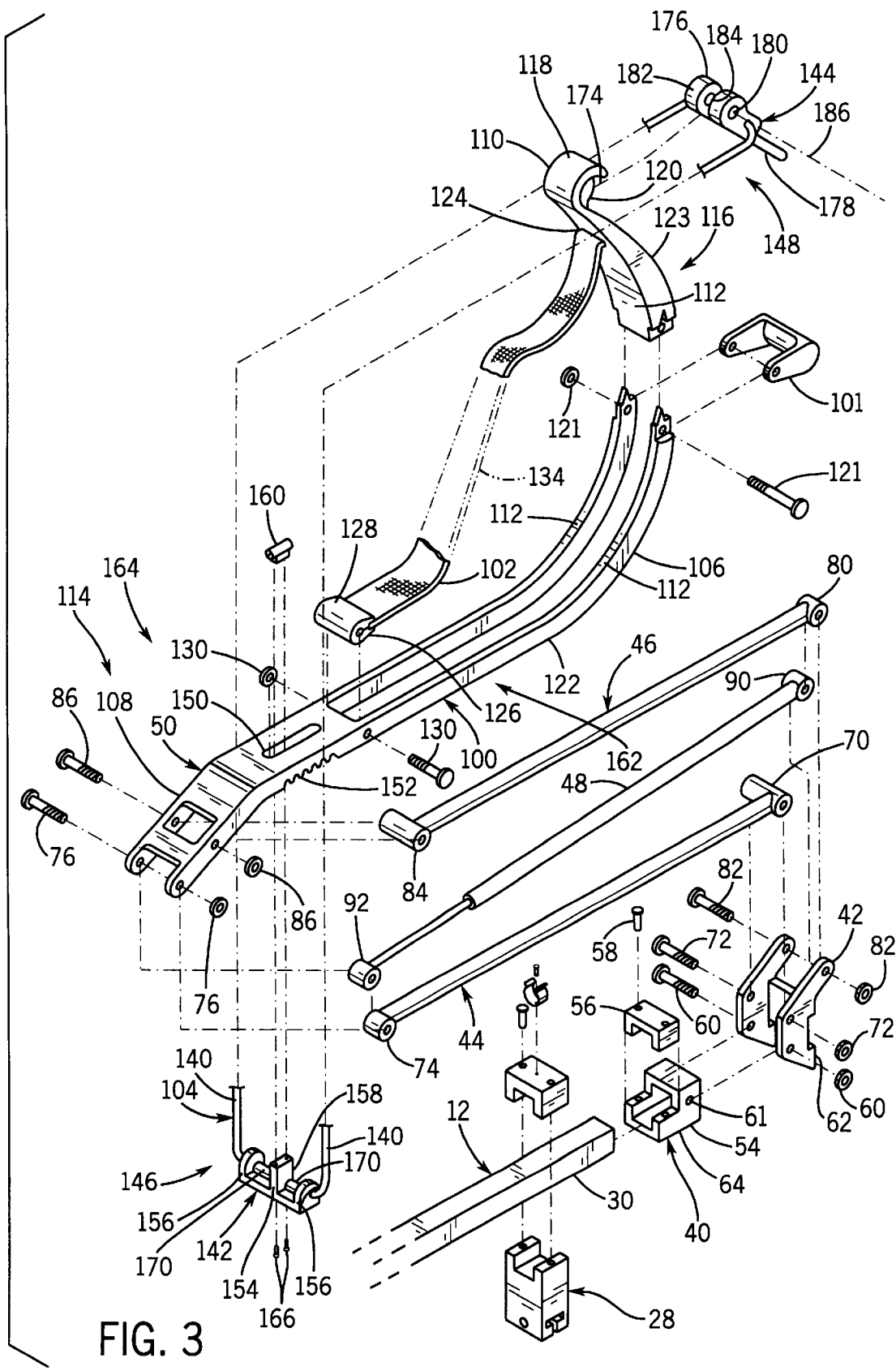
FIG. 3 is an enlarged top perspective exploded view of the carrier of FIG. 2.

FIG. 1 is a top perspective view of cargo carrier system 10 mounted to a vehicle roof rack 12 upon a vehicle 14. Vehicle 14 preferably comprises a typical automobile having a front 16, a rear 18, a first side 20, a second opposite side 22, and a roof 24. For purposes of this description, front 16, rear 18, first side 20 and second opposite side 22 more specifically mean the generally four vertical planes on each of the four sides of vehicle 14 and extend perpendicular to one another and that generally form a rectangle. As will be appreciated, the actual surfaces of vehicle 14 on the front 16, the rear 18, the first side 20 or the second opposite side 22 may have variously configured sloped or rounded surfaces. Moreover, for purposes of this description, roof 24 is assumed to extend in a generally horizontal plane perpendicular to the planes of the front 16, the rear 18 or the sides 20, 22, despite the fact that roof 24 may also have various sloped, inclined or rounded portions. As conventionally known, roof 24 includes a rail 26 proximate to each side 20, 22 of roof 24 to which roof rack 12 is mounted. Alternatively, roof 24 includes conventionally known rail gutters to which rack 12 is mounted. As will be appreciated, rack 12 may be mounted to roof 24 by various other alternative means or may be integrally formed as part of roof 24. Roof rack 12 is conventionally known and generally includes feet or towers 28 and load beams 30, 32. Towers 28 mount to rails 26 and extend above roof 24 to support load beams 30, 32. Load beams 30, 32 comprise elongate bars or rods supported and elevated above roof 24 by towers 28. Beams 30, 32 transversely extend across roof 24 and preferably extend beyond sides 20, 22 of vehicle 14. Although load beams 30, 32 are illustrated as having a generally rectangular cross sectional shape, load beams 30, 32 may alternatively have circular or other cross sectional shapes. Although carrier system 10 is illustrated in conjunction with roof rack 12, carrier system 10 may be alternatively employed within a variety of other roof racks having different designs and configurations.

Carrier system 10 includes a plurality of cargo carriers 36 mounted to roof rack 12 and spaced apart from one another so as to adequately support and contain elongate cargo such as the elongate watercraft 38 shown in phantom. As will be appreciated, the exact number of cargo carriers 36 and the required spacing between cargo carriers 36 may be varied depending upon the particular type of elongate cargo being held as well as the overall dimensions and mass of the cargo being held. In the exemplary embodiment shown in FIG. 1, cargo carrier system 10 includes two cargo carriers 36 which are mounted to load beams 30 and 32, respectively, and that are longitudinally spaced from one another along the length of vehicle 14 proximate side 20. In lieu of being mounted to load beams 30, 32, carrier 36 may alternatively be mounted to other structures of a roof rack depending upon the configuration of the roof rack employed upon roof 24 of vehicle 14. Moreover, carrier system 10 may additionally cargo carriers 36 proximate to side 22 for supporting the plurality of elongate cargo above roof 24.

FIGS. 2 and 3 illustrate a single cargo carrier 36 in greater detail. FIG. 2 is an enlarged top perspective view of cargo carrier 36. FIG. 3 is an fragmentary exploded top perspective view of cargo carrier 36. As shown by FIGS. 2 and 3, each cargo carrier 36 generally includes carrier mount 40, base 42, link 44, link 46, load assist 48 and cargo holder 50. Mount 40 removably mounts the remainder of cargo carrier 36 to load beam 30 of roof rack 12. Mount 40 generally includes halves 54, 56 and fasteners 58 (only one of which is shown). Halves 54 and 56 are configured to at least partially surround and clamp about an axial end portion of load beam 30 extending beyond tower 28 which also clamps about load beam 30. Securement of halves 54 and 56 about load beam 30 is facilitated by fasteners 58 which preferably comprise threaded screws or bolts which threadably engage internal threads in half 54 to draw halves 54 and 56 together about load beam 30. Alternatively, halves 54 and 56 may be drawn together by other mechanisms such as over-center cams and the like. Although less desirable, mount 40 may alternatively be secured to load beam 30 by screws, bolts or other fasteners extending through bores formed within load beam 30. In yet other alternative embodiments, mount 54 may be integrally formed as part of beam 30 or may be omitted in its entirety, whereby base 42 is directly mounted to beam 30.

Base 42 mounts to load beam 30 by means of mount 40 and generally comprises a clevis-shaped bracket structure pivotably coupled to mount 40 by fastener components 60. In the exemplary embodiment, fastener components 60 comprise a conventionally known nut and bolt extending through aligned bores 61 within half 54 of mount 40. Base 42 pivotably supports the remaining components of cargo carrier 36 relative to mount 40 and roof rack 12. To limit the extent to which it may be rotated, base 42 includes stop surface 62 which is configured to engage stop surface 64 as will be described in greater detail hereafter. Although less desirable, base 42 may alternatively be fixedly coupled, directly or indirectly, to roof rack 12.

Link 44 couples cargo holder 50 to base 42 and generally comprises an elongate rod or bar having a first end 70 pivotably coupled to base 42 by fastener components 72 and a second opposite end 74 pivotably coupled to cargo holder 50 by fastener components 76.

Link 46 further assists in coupling cargo holder 50 to base 42. Link 46 comprises an elongate rod or bar having a first end 80 pivotably coupled to base 42 by fastener components 82 and a second opposite end 84 pivotably coupled to cargo holder 50 by fastener components 86. Links 44 and 46, together, form a two-bar linkage assembly extending between base 42 and cargo holder 50. As described in greater detail hereafter, links 44 and 46 enable cargo holder 50 to be vertically raised and lowered while cargo holder 50 extends in a single plane or in planes which are parallel to one another such that the orientation of the cargo held by holder 50 is not shifted or changed as holder 50 is raised and lowered. Although less desirable, one of links 44 and 46 may alternatively be omitted.

Load assist 48 assists with the raising and lowering of cargo holder 50 by biasing cargo holder 50 to a raised position. In the exemplary embodiment, load assist 48 comprises a conventionally known gas shock having a first end 90 and a second opposite end 92. End 90 is pivotably coupled to end 80 of link 46 and base 42 by fastener components 82. End 92 is pivotably coupled to end 74 of link 44 and cargo holder 50 by fastener components 76. In lieu of comprising a gas shock, load assist 48 may alternatively comprise a conventionally known spring-loaded shock or hydraulic shock. In an alternative embodiment, load assist 48 comprises a linear actuator configured to selectively extend and retract in response to control signals from a conventionally known control circuit configured in a manner to generate the control signals in response to user input or processor control input so as to positively raise or lower cargo holder 50. Examples of linear actuators include pneumatic piston-cylinder assemblies, hydraulic piston-cylinder assemblies or electrically driven solenoids. Although less desirable, load assist 48 may be omitted in selected applications.

Cargo holder 50 holds and retains elongated cargo and generally includes arm 100, handle 101, support 102, and hold down member 104. Arm 100 generally comprises an elongate rigid structure including arcuate portion 106, mounting portion 108 and hook portion 110. Arcuate portion 106 generally extends between mounting portion 108 and hook portion 110 and includes a concave supporting surface 112 configured to at least partially receive an elongate cargo. In the exemplary embodiment, surface 112 is configured to receive an elongate watercraft such as a canoe or kayak. Alternatively, surface 112 is configured to support alternative elongate cargo such as surfboards, ski poles or skis, by way of example only.

Mounting portion 50 extends on one side 114 of arcuate portion 106 and is configured to be pivotably mounted to links 44 and 46. Mounting portion 108 additionally provides a structure to which one end of hold down 104 is mounted. As will be appreciated, the exact configuration and dimensions of mounting portion 108 may vary depending upon the configuration of links 44, 46 as well as the remainder of arm 100.

Hook portion 110 extends on another side 116 of arcuate portion 106 and is configured for being releasably connected to an end of hold down 104. In the exemplary embodiment, hook portion 110 includes an outwardly extending hook 118 and a centrally extending rib 120 centrally located within the concave portion of hook 118. Hook 118 and rib 120 facilitate securement of hold down 104 to hook portion 110 of arm 100. Alternatively, other arrangements may be used to permanently or releasably secure an end or portion of hold down 104 to one side of arcuate portion 106.

Figure 4A:
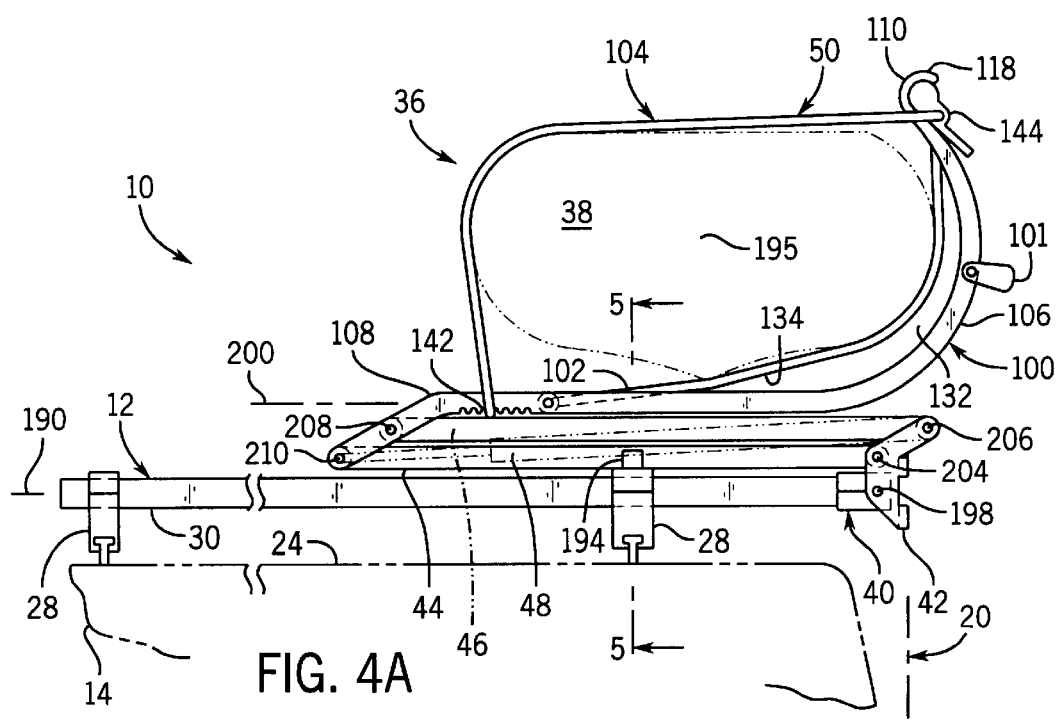
FIG. 4A is a side elevational view of the carrier of FIG. 2 in a horizontal stowed position.

Handle 101 comprises a structure configured to be grasped by a user that is coupled to arm 100 in a location so as to permit handle 101 to be easily grasped by a user when cargo holder 50 is in the horizontal stowed position shown in FIG. 4A and to further permit the user to be able to pull down cargo holder 50 towards the vertical lowered loading position shown in FIG. 4C. In the exemplary embodiment, handle 101 is pivotably coupled to arcuate portion 106 of arm 100 by fastener components 121 which preferably comprise a bolt and an associated nut secured thereto. Alternatively, handle 101 may be fixedly coupled to arcuate portion 106 or alternative locations along arm 100. In the exemplary embodiment, handle 101 is coupled to arm 100 at a juncture of two components 122, 123 which are also joined together by fastening components 121 to form arm 100. Alternatively, arm 100 may be formed from a greater number of components which are coupled to one another or may be formed as a single unitary body.

Although arm 100 is illustrated as comprising a generally J-shaped member, arm 100 may have alternative shapes depending upon the exact configuration of the elongate cargo being held. The J-shaped configuration of arm 100 is preferred for holding elongate watercraft such as canoes and kayaks. However, depending upon the exact configuration of the cargo being held, arm 100 could have different shapes and configurations. For example, arm 100 may alternatively be L-shaped or may have three portions that extend perpendicular to one another to form a rectangular-shaped box extending below the cargo to be held.

Support 102 comprises an elongate flexible member adapted to uphold and support elongate cargo preferably above or spaced from surface 112 of arcuate portion 106. In the exemplary embodiment, support 102 comprises an elongate flexible band or strap of flexible material. Support 102 has a first end 124 pivotably coupled to side 116 of arcuate portion 106 and a second end 126 pivotably coupled to side 114 of arcuate portion 106. In the exemplary embodiment, end 124 pivots about a natural living hinge. End 126 includes a rigid coupling member 128 that is pivotably coupled to arm 100 by means of fastener components 130 that extend through arm 100 and through coupling member 128. Alternatively, ends 124, 126 may both pivot by means of a living hinge or may pivot by means of pins, bolts or other fastener components. Because support 102 is flexible, support 102 adjusts its shape to accommodate the various contours of the elongate cargo being supported. In addition, support 102 supports the elongate cargo at a distance spaced above the arm 100 such that a gap 132 (as best shown in FIG. 4A) is created between arm 100 and an intermediate portion 134 of support 102. By way of analogy, support 102 supports the elongate cargo in a fashion similar to that of a hammock suspended between two trees. As a result, support 102 enables cargo holder 50 to more securely retain the cargo being held while reducing the likelihood of the cargo being damaged as a result of contact with rigid arm 100.

Hold down 104 cooperates with support 102 to sandwich the elongate cargo therebetween. Hold down 104 generally includes retaining member 140, hold down attachment 142 and coupling member 144. Retaining member 140 is configured to extend opposite to support 102 with the elongate cargo captured between retaining member 140 and intermediate portion 134 of support 102. In the exemplary embodiment, retaining member 140 preferably comprises an elongate flexible member that is sufficiently flexible such that retaining member 140 flexes and deforms either elastically or inelastically to conform to a contour of the cargo being held by carrier 36. As shown in FIG. 9, because retaining member 140 is preferably flexible, retaining member 140 conforms to a variety of differently shaped and sized elongate cargo and also more reliably holds the cargo in place. Preferably, retaining member 140 comprises one or more cords of vinyl coated metal cable material. Alternatively, retaining member 140 may comprise bands, straps or other structures of relatively flexible material such as low durometer plastic such as nylon or urethane. Although less desirable, retaining member 140 may alternatively comprise a relatively rigid elongate member. In such an alternative embodiment, retaining member 140, if rigid, would preferably be preformed or preconfigured to correspond to the shape and dimensions of the cargo intended to be held by carrier 36.

In yet another alternative embodiment, cargo holder 50 may omit support 102 and hold down 104 where the elongate cargo is directly attached to arm 100 or where a specialized mounting support configured to hold the intended cargo is mounted to arm 100. For example, it is contemplated that carrier system 10 may alternatively be utilized to support packed equipment containers containing a variety of equipment such as camping equipment, diving and snorkeling equipment, construction tools and the like. In such alternative applications, the equipment container may be held in place between support 102 and hold down 104 or may alternatively be provided with clips or other mechanisms configured to releasably mount the container directly to arm 100 or may be configured to be mounted to an intermediate structure which is directly mounted to arm 100. The equipment container would also preferably be configured to be directly mounted to a supporting structure hanging along a garage or storage shed wall. As a result, a user could simply dislodge the equipment container from the garage or storage shed wall, position it on cargo holder 50 while cargo holder 50 is in the loading position and reposition cargo holder 50 to the stowed position. Depending on the configuration of the equipment container, arcuate portion 106 of arm 100 may be omitted or replaced with other non-arcuately shaped extensions.

In the exemplary embodiment, retaining member 140 has a first end 146 coupled to end 114 of arm 100 on a first side of arcuate portion 106 and a second opposite end 148 coupled to end 116 of arm 100 on an opposite side of arcuate portion 106. In the exemplary embodiment, ends 146 and 148 of retaining member 140 are coupled to arm 100 by attachment 142 and coupling member 144. Alternatively, ends 146 and 148 may be coupled to arm 100 by other structures and mounting mechanisms coupled to ends of retaining member 140. Moreover, in particular applications, attachment 142 and coupling member 144 may be omitted where retaining member 140 is directly connected to arm 100.

Attachment 142 is coupled to end 146 of retaining member 140 and adjustably connects retaining member 140 to end 114 of arm 100. In the exemplary embodiment, mounting portion 108 of arm 100 is additionally provided with slot 150 and detents 152 which cooperate with attachment 142 to adjustably mount retaining member 140 to arm 100. Slot 150 comprises an elongate opening extending through mounting portion 108 along an axis extending generally parallel to the longitudinal length of arm 100. Detents 152 comprise depressed portions formed in a back surface of arm 100 on each opposite transverse edge of arm 100 so as to provide a plurality of attachment points at which attachment 142 and retaining member 140 may be releasably secured to arm 100. In the exemplary embodiment, detents 152 comprise a plurality of longitudinally spaced teeth. Alternatively, detents 152 may comprise other location attachment points such as depressions, openings or other surface irregularities.

Attachment 142 mounts to arm 106 via slot 150 and detents 152. Attachment 142 generally includes tongue assembly 154 and wings 156. Tongue assembly 154 movably couples attachment 142 to arm 100 and generally includes tongue 158 and cap 160. Tongue 158 integrally projects from between wings 156 towards slot 150 from a back side 162 of arm 100. Cap 160 is positioned on a front side 164 and extends through slot 150 at which point cap 160 is secured to tongue 158 via fasteners 166. Cap 160 generally comprises a head having a dimension greater than the dimension of slot 150 such that mounting portion 108 of arm 100 is captured between cap 160 and wings 156. Tongue 158 and cap 160 are preferably dimensioned so as to permit attachment 142 to slide within slot 150. Alternatively, attachment 142 may be movably coupled to arm 100 by various other movable mounting arrangements such as other tongue and groove arrangements, tracks, and the like.

Wings 156 integrally extend from tongue 158 on opposite sides of tongue 158. Wings 156 are connected to end 146 of retaining member 140 and include detent engaging surfaces 170. Detent engaging surfaces preferably provided by ribs extending on opposite sides of tongue 158. Detent engaging surfaces 170 are configured to engage detents 152 at one of a plurality of possible attachment points. As will be described in greater detail hereafter, wings 156 are preferably formed from a resilient elastomeric material that enables wings 156 to be flexed away from back surface 164 of arm 100 so as to withdraw detent engaging surfaces 170 out of engagement with detents 152 to allow attachment 142 to be slid and repositioned within slot 150 at a desired attachment point. Although less desirable, fasteners 166 may alternatively simply be adjusted such that detent engaging surfaces 170 may be withdrawn out of engagement with detents 152 to allow attachment 142 to be repositioned within slot 150.

Coupling member 144 is secured to end 148 of retaining member 140 and is configured to secure end 148 to end 116 of arm 100. In the exemplary embodiment, coupling member 144 comprises a rigid member configured to be received within the nook 174 of hook 118. Coupling member 144 generally includes body 176, lever 178 and optional locking mechanism 180. Body 176 comprises a generally cylindrical portion having an outer circumferential surface 182 and channel 184. When coupling member 144 is secured to hook 118 of arm 100, circumferential surface 182 bears against the interior surface of nook 174, allowing body 182 and the remainder of coupling member 144 to be pivoted or rotated about the central axis 186 of circumferential surface 182. Channel 184 centrally extends through body 182 and is sized to receive flange 120. Channel 184 receives flange 120 to maintain alignment of body 182 within hook 118 and to further facilitate locking of coupling member 144 to arm 100.

Lever 178 extends from body 176 and provides a handle by which coupling member 144 may be rotated about axis 186 when positioned within hook 118. Handle 178 further provides a structure to which end 148 of retaining member 140 is secured eccentric with respect to axis 186. As a result, once body 176 of coupling member 144 is positioned within hook 118, rotation of coupling member 144 about axis 186 adjusts the position of retaining member 140 to adjust the tension of retaining member 140 as member 140 bears against the cargo being held. Coupling member 144 provides an over-center action to maintain a preselected desired tension of retaining member 140 as member 140 bears against the cargo being held. Once the cargo is secured in place, locking mechanism 180 locks coupling member 144 to arm 100 to assist in preventing theft of cargo held by carrier 36. Although less desirable, end 148 of retainer 140 may alternatively be releasably secured to end 116 of arm 100 by various other connection mechanisms. Moreover, end 148 of retaining member 140 may alternatively be permanently secured to end 116 of arm 100 while end 146 is releasably secured to end 114 of arm 100.

Figure 4B:
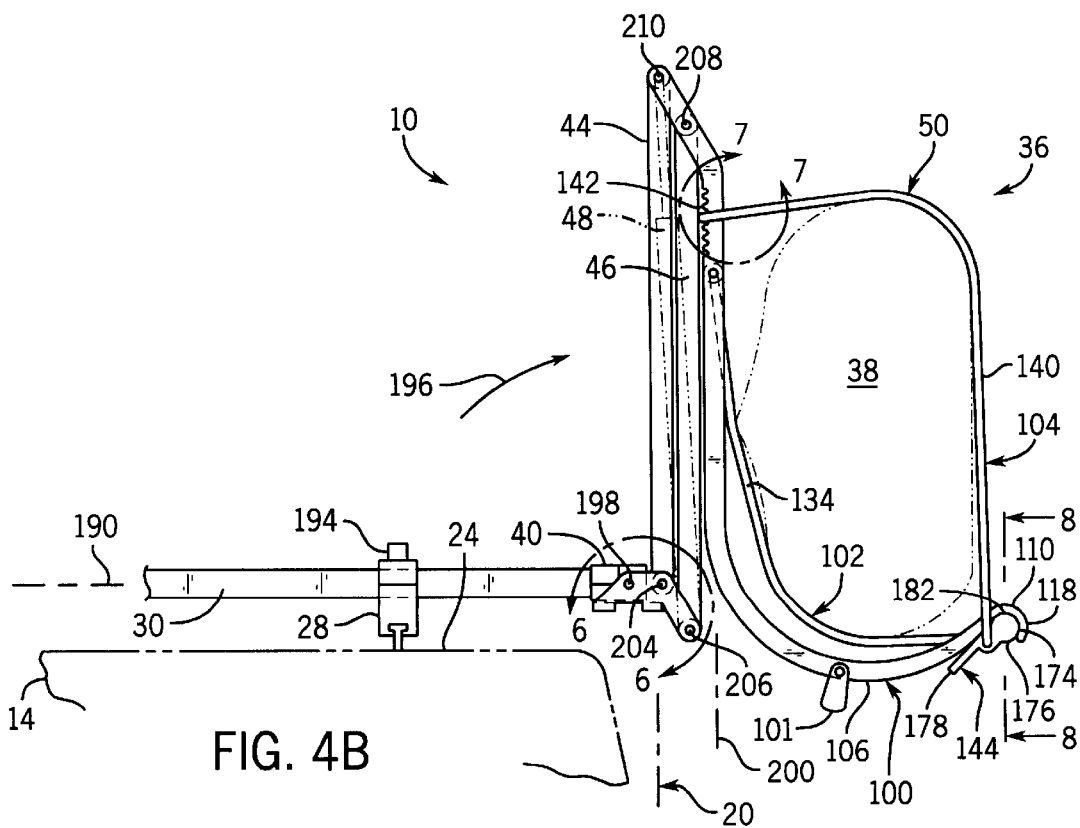
FIG. 4B depicts the carrier of FIG. 4A repositioned to a vertical raised loading position.

FIGS. 8, 8a, 8b and 9 illustrate the operation of hold down 104 in greater detail. FIG. 8 is an enlarged fragmentary sectional view taken along line 8—8 of FIG. 4B depicting detent engaging surface 170 engaging a selected one of detents 152 at a desired attachment point along the back side 162 of arm 100. As a result, retaining member 140, which is preferably flexible, has a selected tension as it bears against the cargo being held. FIG. 8a is a fragmentary sectional view of attachment 142 and arm 100 of FIG. 8 taken along line 8a—8a. FIG. 8b is identical to FIG. 8a except that FIG. 8b illustrates wings 156 being flexed away from the back side 162 of arm 100 to an extent such that detent engaging surfaces 170 out of engagement with detents 152. As a result, attachment 142 may be slidably repositioned within slot 150 so as to reposition detent engaging surfaces 170 across from a different set of detents 152. Upon release of wings 156, wings 156 resiliently return their original shape and position to position detent engaging surfaces 170 into engagement with the new opposing detents 152 at a new attachment point along arm 100. In this way, attachment 142 may be repositioned along arm 100 to vary the point at which retaining member 140 is coupled to arm 100 and to vary the tension of retaining member 140 about the cargo being held. Consequently, the positioning of retaining member 140 may be adjusted to accommodate differently sized and configured cargo and may also be repositioned to assure a reliable hold upon the cargo being held. As best shown by FIGS. 8a and 8b, each of wings 156 preferably includes press pads 186 that face the front side 164 of arm 100 to facilitate flexing of wings 156 as shown in FIG. 8b.

FIG. 9 illustrates the securement of coupling member 144 to hook 118 of arm 100 in greater detail. FIG. 9 is a sectional view of carrier 36 taken along line 9—9 of FIG. 4B. As shown by FIG. 9, body 176 of coupling member 144 receives locking mechanism 180. Locking mechanism 180 comprises a conventionally known key-actuated lock which actuates between a first position in which flange 120 is locked to coupling member 144 and a second position in which coupling member 144 may be separated from flange 120. As a result, locking mechanism 180 minimizes the risk of coupling member 144 from becoming accidentally dislodged from hook 118 or the risk of the cargo being removed from carrier 36 when the vehicle or its cargo are unattended. Alternatively, other locking mechanisms, such as combination actuated locking mechanisms, may be used to secure end 148 of retaining member 140 to arm 100. Although less desirable, coupling member 144 may alternatively omit locking mechanism 180. In such an application, flange 120 as well as channel 184 may also be omitted.

Figure 5:
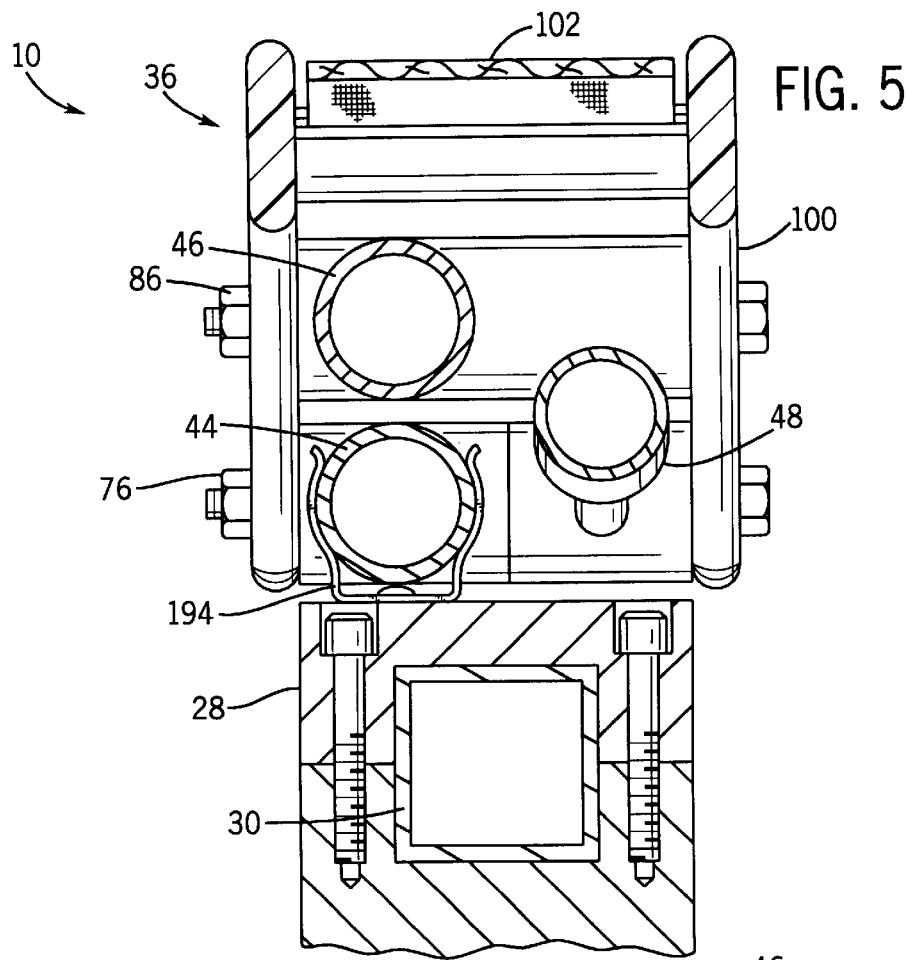
FIG. 5 is a fragmentary sectional view of the carrier of FIG. 4A taken along line 5—5.

FIGS. 4A through 4C illustrate operation of carrier system 10 and its carriers 36. In particular, FIG. 4A depicts carrier 36 and its held cargo 38 in a horizontal stowed position in which carrier 36 supports cargo 38 entirely above roof rack 12 and in which arm 100 generally extends a horizontal orientation substantially parallel to the plane 190 in which load beams 30 of roof rack 12 extend. In the exemplary embodiment, links 44 and 46 also extend parallel to plane 190. In the horizontal stowed position, the center of mass of cargo 38 and the center of mass 195 of cargo 38 is located above roof rack 12 and preferably above roof 24 of vehicle 14. As a result, cargo 38 is more stably secured. As best shown by FIG. 5, in the horizontal stowed position, link 44 is releasably secured within a substantially C-shaped resilient clamp 194 mounted to tower 28. Clamp 194 prevents accidental pivotal movement of carrier 36 extending horizontal in a vertical position (shown in FIG. 4B) and reduces shaking or vibration of carrier 36 during transport. Clamp 194 also supports carrier 36 in a more level orientation.

Figure 6:
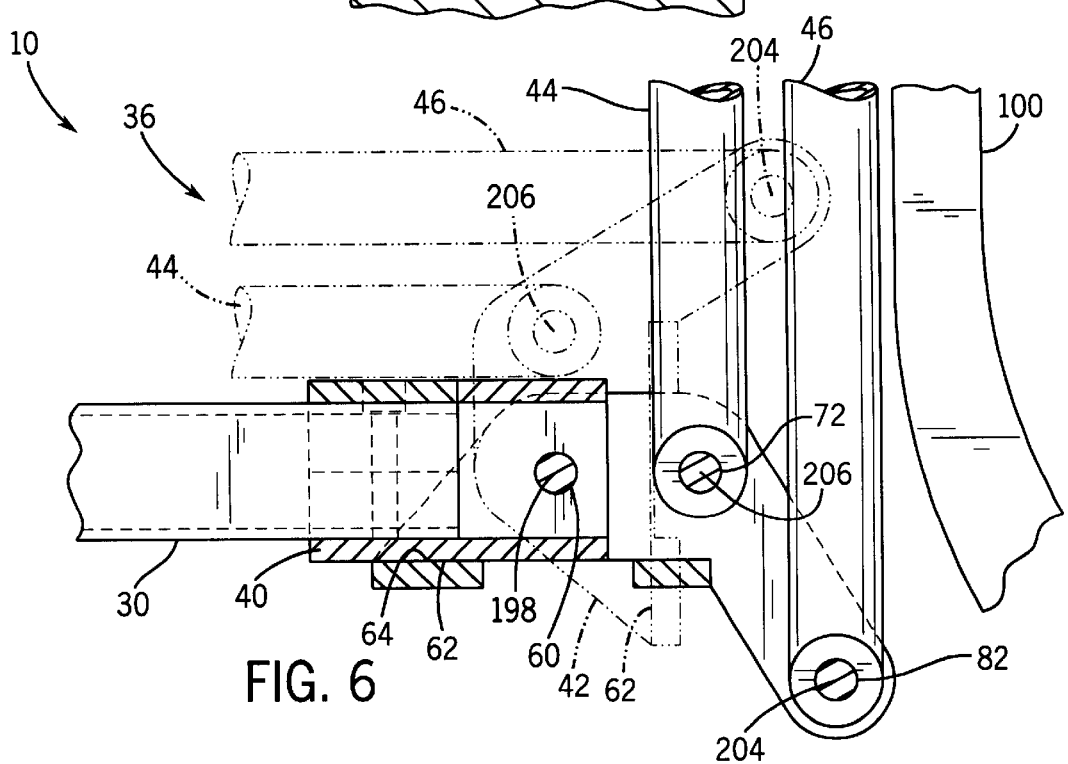
FIG. 6 is an enlarged fragmentary perspective view of the carrier of FIG. 4B taken along line 6—6.

FIG. 4B depicts base 42 and the remaining components of carrier 36 being pivoted in the direction indicated by arrow 196 about axis 198 extending parallel to side 20 of vehicle 14 and within a plane substantially parallel or coincident with plane 190. Pivotal movement of base 42 about axis 198 is limited by stop surfaces 62 and 64 (shown in FIG. 3). In particular, stop surface 62 (best shown in FIG. 6) bears against stop surface 64 when carrier 36 is in the depicted vertical raised loading position. In this loading position, the non-arcuate portion of arm 100 generally extends in a vertical plane 200 that extends parallel to side 20 of vehicle 14 and perpendicular to plane 190. In the exemplary embodiment, when carrier 36 is in the vertical raised loading position, links 44 and 46 also extend within planes that are generally vertical, that are parallel to side 20 of vehicle 14 and that perpendicular to plane 190. As will be appreciated, the exact angle at which links 44 and 46 extend relative to either the vertical or the horizontal in the stowed position and in the vertical raised loading position may vary while the major non-arcuate portion of arm 100 still extends in a generally horizontal plane as shown in FIG. 4A or a substantially vertical plane as shown in FIG. 4B. In the exemplary embodiment, carrier 36 is manually pivoted from the horizontal stowed position to the vertical raised loading position by the user merely grasping handle 100 and pulling in an outward or downward direction.

FIG. 4C depicts cargo carrier 36 being moved from the vertical raised loading position shown in FIG. 4B to the vertical lowered loading position shown in solid lines. As shown in FIG. 4C, as carrier 36 moves from the vertical raised loading position to the vertical lowered loading position, links 44 and 46 pivot relative to base 42 about axes 204 and 206, respectively. At the same time, arm 100 and holder 50 pivot relative to links 44 and 46 about axes 208 and 210, respectively. When carrier 36 is in either the vertical raised loading position or the vertical lowered loading position, base 42 is oriented such that axes 204 and 206 are intersected by a plane that extends greater than 90 degrees and less than 270 degrees with respect to a longitudinal axis 207 of crossbar or load beam 30. Preferably, axes 204 and 206 are located in a plane that extends between 250 degrees and 260 degrees with respect to axis 207 of load beam 30. In the exemplary embodiment, axes 204 and 206 are intersected by a plane P that extends at an angle A of about 255 degrees with respect to longitudinal axis 207 of load beam 30. As a result, links 44 and 46 engage one another when carrier 36 is in the vertical lowered loading position to suspend holder 150 away from the sides of vehicle 14. In addition, the two-bar linkage provided by links 44 and 46 results in holder 50 and its cargo 38 being lowered in the direction indicated by arrow 212 from the raised position to the lowered position while the major non-arcuate portion 213 of arm 100 maintains a single orientation. In particular, the major non-arcuate portion of arm 100 of holder 50 extends in a generally vertical plane as it moves from the raised position to the lowered position. In the partially lowered position shown in phantom, the major non-arcuate portion of arm 100 extends in a plane 216 that is parallel to plane 218 on side 20 of vehicle 14. In the completely lowered position shown in solid lines, the major non-arcuate portion 213 of arm 100 extends within plane 220 that is parallel to plane 216 and that is also parallel to plane 218. Because links 44 and 46 enable holder 50 to be raised and lowered within altering the orientation of holder 50 and cargo 38, holder 50 and cargo 38 are easier to raise and lower and cargo 38 is less likely to shift during loading.

As links 44 and 46 pivot in the direction indicated by arrows 224, assist 48 brakes any rapid or sudden drop of holder 50 and cargo 38 since assist 48 biases holder 50 towards the vertically raised loading position. Movement of holder 50 from the vertically lowered position to the vertically raised position and then to the horizontal stowed position is achieved by simply performing the aforementioned steps in a reverse manner. During movement of holder 50 from the vertically lowered loading position to the vertically raised loading position, assist 48 aides in lifting holder 50 and cargo 38 by biasing holder 50 towards the raised position.

In summary, cargo carrier system 10 more securely mounts the elongate cargo 38 to an existing vehicle roof rack irregardless of the precise shape or contours of the elongate cargo. In particular, the cargo being held is sandwiched between support 102 and hold down 104. Because support 102 and hold down 104 are both preferably flexible in the exemplary embodiment, support 102 and hold down 104 precisely conform to the shape and contour of the cargo being held to better grip the cargo. At the same time, support 102 suspends the cargo away from rigid arm 100 to prevent abrasion or other damage to the cargo being held.

Cargo carrier system 10 is also simple, easy to mount to an existing roof rack and easy to shift or manipulate for loading and unloading cargo. To load cargo, the user simply pulls on handle 101 to reposition cargo holder 50 to the vertical lowered loading position, rotates coupling member 144 and removes coupling member 144 from hook 118 so as to withdraw hold down retaining member 140 away from support 102. After positioning the cargo upon support 102, retaining member 140 is once again positioned over and about the cargo, coupling member 144 is positioned within the nook 174 of hook 118 and coupling member 144 is rotated to place retaining member 140 in tension about the cargo. Depending upon the size of the cargo, the user may additionally depress wings 156 of attachment 142 to reposition attachment 142 at a different attachment point along arm 100. Once the cargo is secured to each of carriers 36 in a similar fashion, the user simply elevates holder 50 and its cargo to reposition holder 50 and cargo 38 to the raised loading position. The elevation of holder 50 is assisted by force from assist 48. Once in the vertical raised loading position, the user simply pivots holder 50 about axis 198 to the horizontal stowed position. Unloading of cargo from carrier 36 is achieved by performing the aforementioned steps in a reversed order.

Because holder 50 is generally in a horizontal orientation when in a stowed position, the underlying vehicle can more easily pass into openings having generally low clearances, such as a garage opening. At the same time, because a majority of the width of holder 50 extends across a top of lift 14 of a vehicle, holder 50 does not substantially project beyond either of sides 20 or 22 of the vehicle. As a result, the underlying vehicle can more easily fit into narrower openings such as a narrow garage opening. This is all achieved while allowing the user to easily load and unload cargo supported in a lowered position along a side of the vehicle.

Figure 10:
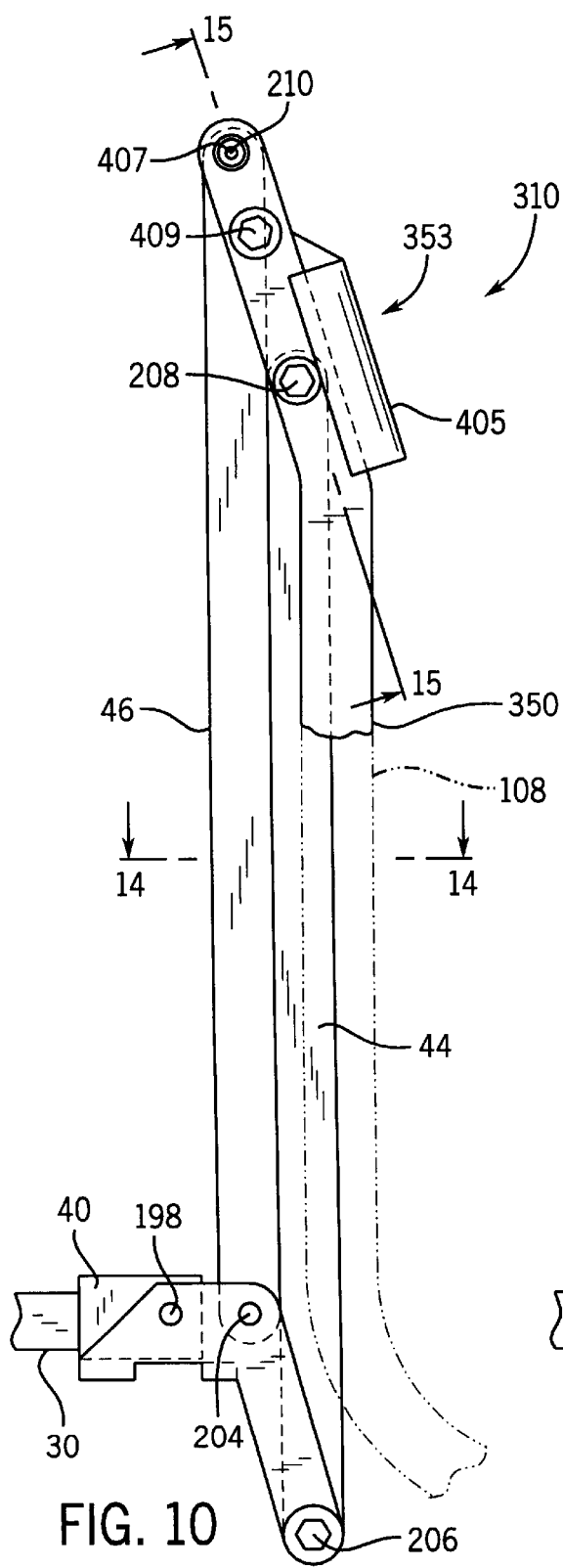
FIG. 10 is a side elevational view of a first alternative embodiment of the cargo carrier system of FIGS. 1–9, illustrating a cargo holder in a vertical raised position.
Figure 11:
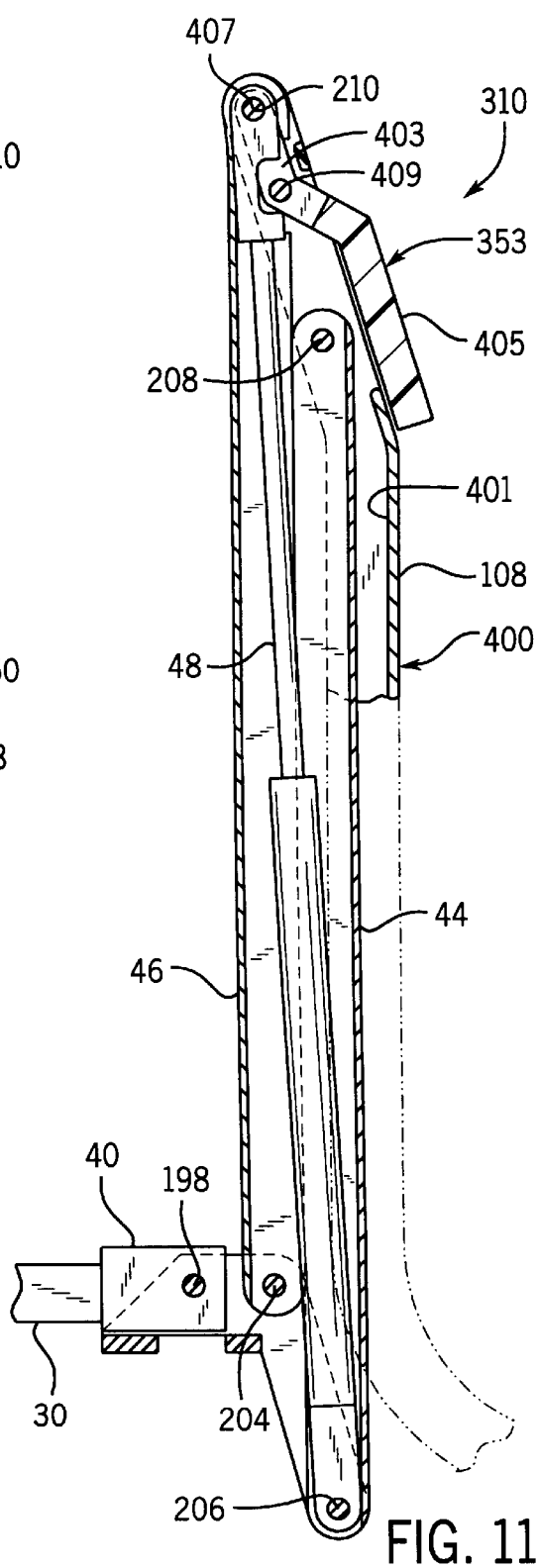
FIG. 11 is a sectional view of the cargo carrier system of FIG. 10.

FIGS. 10–15 illustrate cargo carrier system 310, a first alternative embodiment of cargo carrier system 10 shown in FIGS. 1–9. Cargo carrier system 310 is substantially identical to cargo carrier system 10 except that cargo carrier system 310 includes cargo holder 350 in lieu of holder 50. Cargo carrier system 310 additionally includes a locking mechanism 353. For ease of illustration, those remaining components of cargo carrier system 310 which are identical to corresponding components of cargo carrier system 10 are numbered similarly. Cargo holder 350 is substantially identical to cargo holder 50 except that cargo holder 350 includes arm 400 in lieu of arm 100. Arm 400, like arm 100, generally comprises an elongate rigid structure including cargo portion 106, mounting portion 108 and hook portion 110 (described and illustrated with respect to arm 100 in FIGS. 2 and 3). However, as best shown in FIGS. 10, 11 and 14, mounting portion 108 of arm 400 includes at least a portion which is open or hollowed out. In the exemplary embodiment, mounting portion 108 of arm 400 is generally U-shaped so as to form a hollow interior 401 which faces link 44 when holder 350 is in a raised vertical position (shown in FIGS. 10 and 11) or the raised horizontal position (as shown in FIGS. 2 and 4A with respect to cargo holder 50). As shown by FIGS. 10 and 11, due to their configurations, arm 400 and link 44 nest with one another. In the exemplary embodiment, interior 401 receives at least a portion of link 44. As a result, cargo carrier system 310 occupies less space above the roof of vehicle 14 when cargo carrier system 310 is in the raised horizontal position. Consequently, vehicle 14 and cargo carrier system 310 more easily pass below underpasses and garage openings which have limited vertical clearance. In the preferred embodiment, link 44 and arm 400 preferably extend substantially parallel to one another when nested with one another. Although less desirable, link 44 and arm 400 may alternatively extend non-parallel to one another while nested. Moreover, in alternative embodiments, link 44 may be configured to include a hollow internal opening, similar to interior 401, which is sized and configured to receive at least a portion of arm 400.

Figure 15:
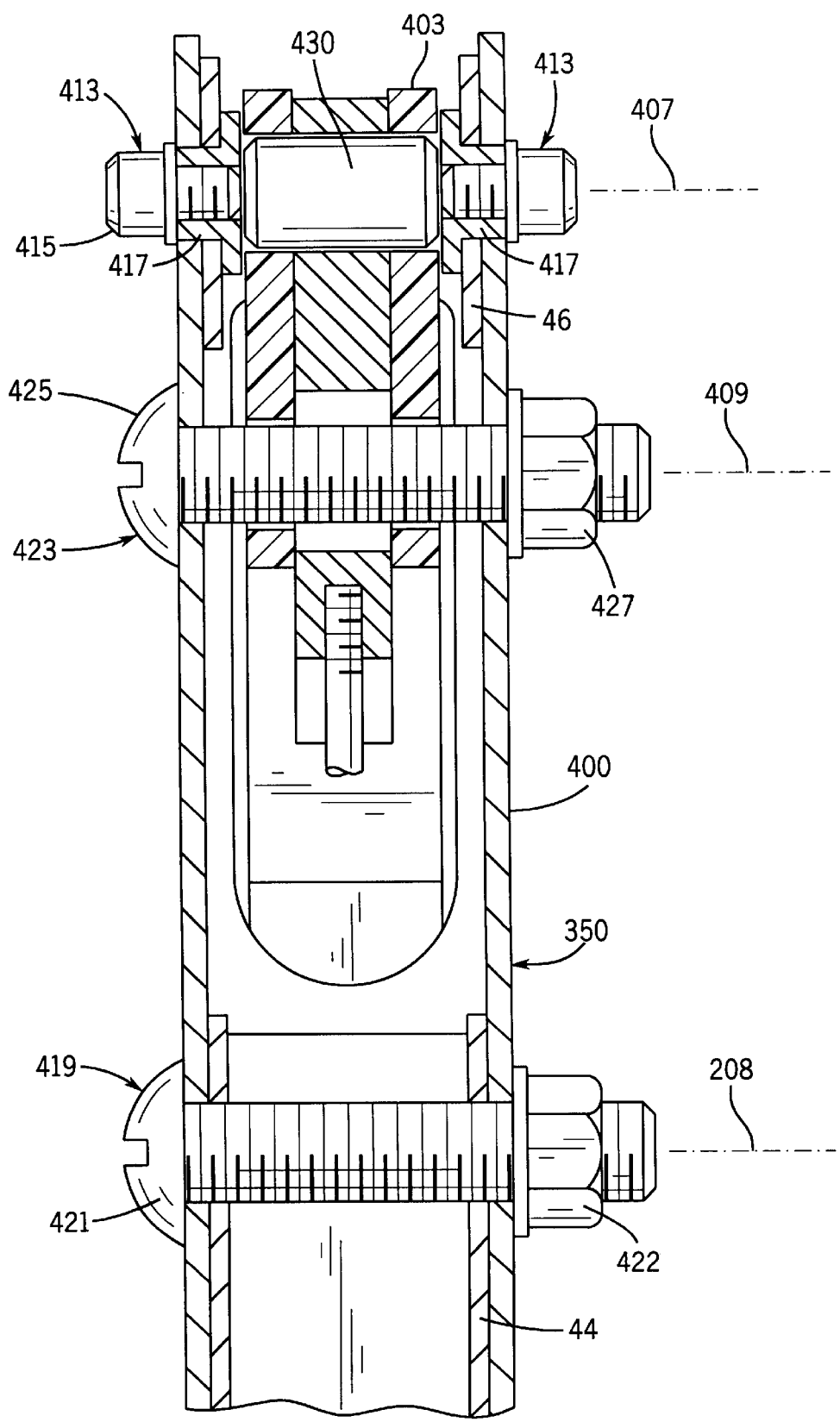
FIG. 15 is a sectional view of the cargo carrier system of FIG. 10 taken along line 15—15.

Locking mechanism 353 is mounted to cargo holder 350 and releasably locks or retains cargo holder 350 in place. Similar to cargo holder 50, cargo holder 350 moves between a raised position (shown in FIGS. 4B, 10 and 11) and at least one lowered position (shown in FIGS. 4C, 12 and 13). A load assist 48 biases cargo holder 350 towards the raised position. Locking mechanism 353 is configured to releasably lock holder 350 in the at least one lowered position. In particular, locking mechanism 353 actuates between a locked position (shown in FIG. 13) in which movement of cargo holder 350 is restrained and a released position (shown in FIG. 12) in which cargo holder 350 may be moved back and forth between the raised position and the at least one lowered position. As shown by FIGS. 12–13 and 15, locking mechanism 353 generally includes member 403 and handle 405. Member 403 comprises a rigid structure pivotally coupled to load assist 48 about axis 407 and pivotally coupled to cargo holder 350 about axis 409. As noted above, link 44 is pivotally coupled to base 30 about axis 206. Likewise, load assist 48 is pivotally coupled to link 44 also about axis 206. Axes 206 and 409 are each generally intersected by a line 410 extending between links 44 and 46. During actuation of locking mechanism 353 between the locked position (shown in FIG. 13) and the released position (shown in FIG. 12), load assist 48 and axis 407, about which load assist 48 is pivotally connected to member 403, pivot about axis 409 along an arc. In the locked position shown in FIG. 13, axis 407 lies on one side of line 410 closer or more proximate to link 44 than link 46. In the released position, axis 407 lies on an opposite side of line 410 closer or more proximate to link 46. As shown in FIG. 13, in the locked position, the end of load assist 48 and member 403 generally bear against link 44. When locking mechanism 353 is in the locked position shown in FIG. 13, movement of cargo carrier 353 towards the raised position requires that axis 407 pivot about axis 409 in a counter-clockwise direction (as seen in FIG. 13). Because link 44 prevents such movement, locking mechanism 353 prevents movement of cargo holder to a raised position under the force from load assist 48. At the same time, because movement of axis 407 in the opposite clockwise direction (as seen in FIG. 13) requires compression of load assist 48, locking mechanism 353 remains in the locked position unless sufficient torsional force is applied to member 403 to further compress load assist 48 and to reposition axis 407 past line 410 proximate to link 46. As shown in FIG. 12, once repositioned to the released position past line 410 proximate to link 46, locking mechanism 353 permits cargo holder 350 to be moved towards the raised position by the user with the assist of load assist 48. As cargo holder 350 is moved towards the raised position, axis 407 continues to rotate relative to axis 409 in a clockwise direction (as seen in FIG. 12).

Handle 405 extends from member 409 and provides a structure for gripping locking mechanism 353 and for applying sufficient torque to member 403 to actuate locking mechanism 353 between the locked and released positions. Although handle 405 is illustrated as a rigid bar integrally formed with member 403, handle 405 may have any of a variety of alternative shapes and structures and may be formed by alternative components connected to or bonded to member 403. Although locking mechanism 353 is illustrated as comprising a locking mechanism which prevents relative movement of cargo holder 350 and link 44 by means of over-center action, locking mechanism 353 may less desirably have various other configurations that are presently known or that may be developed in the future which prevent relative movement of cargo holder 350 and link 44, prevent relative movement of links 44 and 46 or prevent relative movement of cargo holder 350 and link 46. In addition, locking mechanism 353 or such alternative configurations of such a locking mechanism may be employed with alternative cargo carrier systems having an alternatively configured cargo holder that moves between a raised position and at least one lowered position and that is biased towards the raised position.

As shown by FIG. 15, link 46 is pivotably coupled to arm 400 of cargo holder 350 by fasteners 413, wherein each fastener 413 preferably comprises a bolt 415 threadably engaging a bushing nut 417. Link 44 is pivotably coupled to arm 400 of cargo holder 350 by a fastener 419 preferably comprising a bolt 421 and a nut 422. Rigid member 403 is pivotably coupled to arm 400 of cargo holder 350 by fastener 423 preferably comprising a bolt 425 and a nut 427. Lastly, rigid member 403 is pivotably coupled to load assist 48 by fastener 430 which preferably comprises a pin press fit into fixed engagement with one of load assist 48 and member 403 while rotatably journaled within the other of load assist 48 and member 403. As will be appreciated, any of a multitude of fasteners or alternative structures or arrangements may alternatively be employed to pivotably couple link 44, link 46, member 403 and load assist 48.

Figure 16:
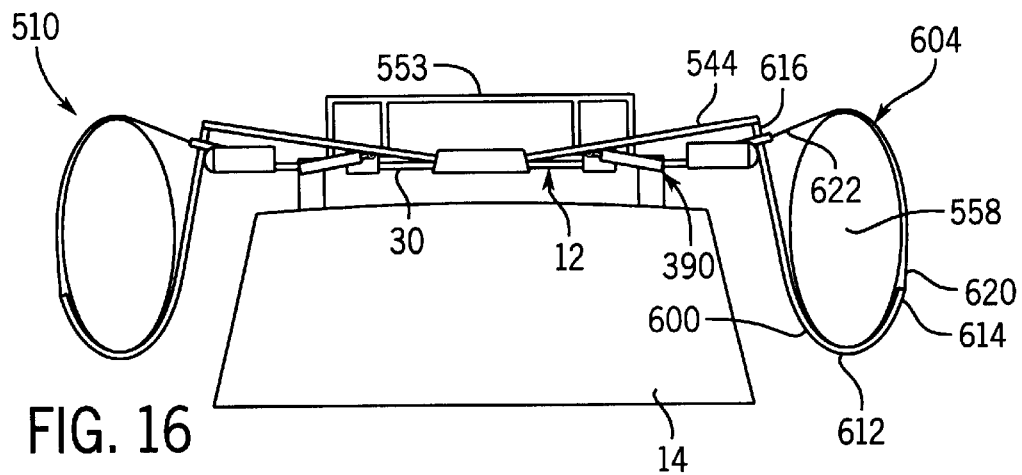
FIG. 16 is a side elevational view of a second alternative embodiment of the cargo carrier system of FIGS. 1–9, illustrating cargo supporting cargo holders in a loading position.
Figure 17:
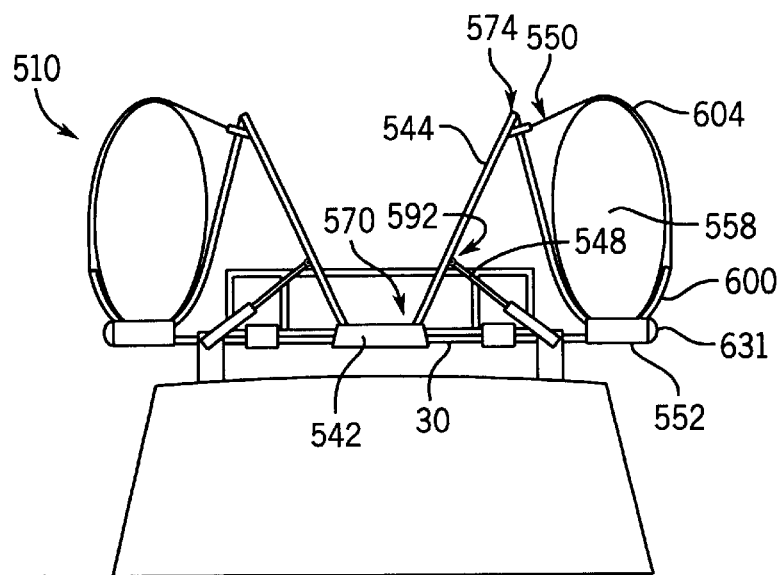
FIG. 17 illustrates a cargo carrier system of FIG. 16 with the supporting cargo holder repositioned to a transport position.
Figure 18:
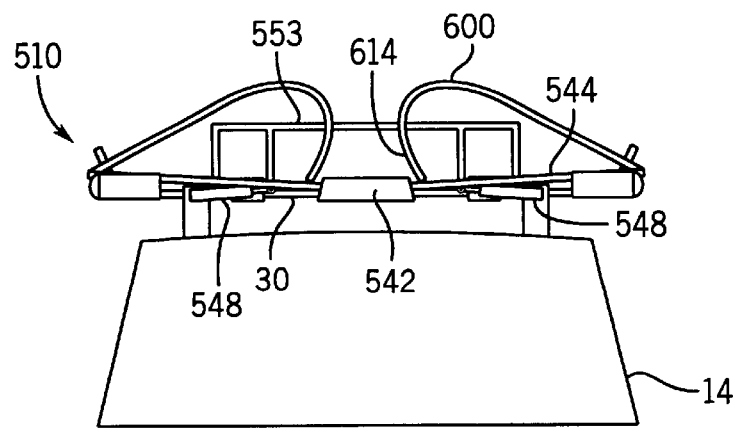
FIG. 18 illustrates the cargo carrier system of FIG. 16 with the cargo removed and with the cargo holders repositioned to a collapsed stored position.

FIGS. 16–18 illustrate cargo carrier system 510, a second alternative embodiment of cargo carrier system 10. FIG. 16 depicts cargo carrier system 510 in a loading position. FIG. 17 depicts cargo carrier system 510 in a transport position. FIG. 18 illustrates cargo carrier system 510 in a collapsed or folded position. Cargo carrier system 510 includes a plurality of cargo carriers 536 mounted upon each side 20, 22 of vehicle 14. Each cargo carrier 536 of system 310 generally includes base 542, wing or link 544, assist 548, holder 350 and platform 552. Base 542 comprises a rigid clamping structure configured to be clamped about load beam 30 of roof rack 12. FIGS. 16–18 further illustrate roof rack 12 supporting an optional rigid roof mounting framework 553 for mounting additional objects upon roof rack 12.

Link 544 comprises an elongate member pivotally coupled at a first end 570 to base 542 and pivotally coupled at a second end 574 to cargo holder 550. Assist 548 comprises an elongate shock pivotally coupled at a first end 590 to roof rack 12 and pivotally coupled at a second end 592 to link 544. In lieu of being pivotally coupled directly to roof rack 12, assist 548 may be pivotally coupled to an alternative structure which is itself mounted to roof rack 12. Assist 548 biases link 544 and cargo holder 552 to the transport position shown in FIG. 17. In the exemplary embodiment, assist 548 comprises a conventionally known gas shock. Alternatively, assist 548 may comprise other shock mechanisms such as those employing hydraulics or mechanical springs. Moreover, assist 548 may alternatively be reduced with a powered linear actuator such as electrically driven solenoids, hydraulic cylinder assemblies, pneumatic cylinder assemblies and the like, permitting a user to simply press a button to actuate the actuator to move cargo holder 550 between the lowered and raised positions. In lieu of the linear actuator, rotary actuators may also be employed to pivot link 544 about its end 570.

Cargo holder 550 is configured to hold elongate cargo such as elongate watercraft including canoes and kayaks. Cargo holder 550 includes a rigid arm 600 and hold down 604. Arm 600 is generally an elongate rigid J-shaped member having an upper arcuate concave surface 612 and opposite end portions 614, 616. Arcuate surface 612 supports elongate cargo 558 while end portions 614 and 616 extend on opposite sides of cargo 558. In one exemplary embodiment, surface 612 is additionally provided with a soft elastomeric cushioning layer to provide improved gripping of cargo 558 and to prevent undesirable abrasion to cargo 558.

Hold down 604 comprises an elongate member having opposite ends 620, 622 coupled to arm 600 so as to sandwich cargo 558 between arm 600 and hold down 622. In the exemplary embodiment, hold down 604 includes an elongate flexible member such as a cord or strap having one end fixed to arm 600 and a second opposite end releasably connectable to arm 600 to permit easy loading and unloading of cargo 558.

Platforms 552 comprise generally flat members configured to support holder 550 when holder 550 and cargo 558 are in the transport position shown in FIG. 17. The upper surface of platform 552 is preferably contoured or recessed to partially receive a lower surface of arm 600 to better retain arm 600 of holder 550 in place. Each of platforms 552 is preferably releasably clamped to the axial ends of a load beam 30. Alternatively, platform 552 may be mounted to another structure which is in turn mounted to roof rack 12. In addition to supporting holder 550 and cargo 558, platform 552 also assist in guiding the movement of cargo holder 550 between the loading position in FIG. 16 and the transport position in FIG. 17. To this end, each of platform 552 preferably includes one or more rollers 631 rotatably mounted to an end of platform 552. Rollers 631 facilitate the movement of holder 550. Alternatively, rollers 631 may be omitted or may be replaced by other varying mechanisms configured to guide and facilitate movement of cargo holders 550 between the various positions.

In operation, links 544 are pivoted about ends 570 and supports 550 are pivoted about ends 574 to the loading position shown in FIG. 16 and which holder 550 extends substantially below rack 12. After cargo (such as kayaks or canoes) are loaded into each of holders 550, hold downs 604 are tightened and secured in place and holders 550 are manually lifted to the transport position shown in FIG. 17. During movement of holder 550 to the transport position shown in FIG. 17, rollers 631 guide and slidably support the movement of holders 550. Assists 548 further help the user to lift holders 550 to the transport position. As holder 550 is lifted to the transport position, links 544 pivot relative to base 542 and roof rack 12 at end 570 and pivot relative to holder 550 at end 574. Once holder 550 has been completely lifted to the transport position, holder 550 engages a quick release clamp or other locking mechanism to secure holder 550 in the transport position and to prevent holder 550 and cargo 558 from inadvertently extending to the loading position during transport. Upon completion of travel to the desired destination, the locking mechanism is released and holders 550 are extended and lowered once again to the loading position shown in FIG. 16 where cargo 558 may be easily unloaded.

FIG. 18 illustrates carriers 536 in the forward or collapsed state in which carriers 536 are not being used. In the collapsed or folded state, links 544 are generally extended to substantially the same position as the loading position and holders 550 are pivoted about ends 574 towards the center line of automobile vehicle 14 and are releasably locked in place by a conventionally known locking mechanism (not shown). In the folded state, arcuate surface 612 of holder 550 faces downward towards vehicle 14. As a result, carriers 536 assume a compact stored position when not in use.

Although FIGS. 16–18 illustrate a single carrier 536 on each side 20, 22 of vehicle 14, carrier system 510 preferably includes a plurality of such carriers 536 placed along the side of the vehicle depending upon length and mass of the cargo being carried. In one exemplary embodiment, each of carriers 536 on each side of vehicle 14 are preferably coupled to one another so as to simultaneously move between the loading position, the transport position and the folded or collapsed position. Moreover, although FIGS. 16–18 illustrate carrier system 510 adapted to carry cargo on both sides of vehicle 14, carrier system 510 may alternatively be configured to extend along only one side of the vehicle 14.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A cargo carrier for use with a vehicle having a front, a rear, a first side, and a second side, the carrier comprising:
    a base adapted to be pivotably coupled to the vehicle about a first axis extending parallel to the first side;
    a cargo holder configured to be secured to cargo;
    a first link having a first end pivotably coupled to the base about a second axis extending parallel to the first axis and a second end pivotably coupled to the cargo holder about a third axis extending parallel to the first axis; and
    a second link having a first end pivotably coupled to the base about a fourth axis extending parallel to the first axis and a second end pivotably coupled to the cargo holder about a fifth axis extending parallel to the first axis.

2. The carrier of claim 1 further comprising means for limiting pivotal movement of the base about the first axis.

3. The carrier of claim 1, wherein the base comprises a first stop surface, wherein the carrier includes a second stop surface adapted to be coupled to the vehicle, and wherein the first stop surface engages the second stop surface to limit pivotal movement of the base about the first axis.

4. The carrier of claim 1, wherein the cargo holder comprises:
    a rigid arm having an arcuate portion configured to receive an elongate watercraft; and
    a flexible support having a first portion, a second portion and an intermediate portion between the first portion and the second portion, wherein the first portion is coupled to a first side of the arcuate portion, wherein the second portion is coupled to a second side of the arcuate portion and wherein the intermediate portion is spaced above the arm and is adapted to support the elongate watercraft at a distance spaced above the arm such that a gap extends between the arm and the intermediate portion.

5. The carrier of claim 1, wherein the cargo holder comprises:
a rigid arm having an arcuate portion configured to receive an elongate watercraft;
an elongate flexible member having a first end and a second opposite end, wherein the first end is movably coupled to the first side of the arcuate portion and is movable between a plurality of arm attachment points along the arm and wherein the second end is coupled to a second side of the arcuate portion.

6. The carrier of claim 1, wherein the cargo holder moves between a horizontal stowed position and a vertical loading position.

7. The carrier of claim 1, wherein the cargo holder moves between a vertical raised position in which the cargo holder extends above the base in a first plane and a vertical lowered position in which the cargo holder extends at least partially below the base in a second plane parallel to or coextensive with the first plane.

8. The carrier of claim 1 wherein the cargo holder further comprises a support adapted to adjust to accommodate the cargo being supported.

9. The carrier of claim 1 further comprising a mount for removably mounting the cargo carrier to the vehicle.

10. The carrier of claim 1 further comprising a shock having a first end pivotably coupled to the second end of the first link and a second end pivotably coupled to the first end of the second link, wherein the shock biases the first and second links relative to one another so as to resist downward pivotal movement of the first and second links.

11. The carrier of claim 10, wherein the shock comprises a gas shock.

12. The carrier of claim 1, wherein the cargo holder comprises an arm and wherein the arm and one of the first link and the second link at least partially nest with one another.

13. The carrier of claim 12, wherein the arm and said one of the first link and the second link have longitudinal lengths extending along substantially parallel sixth and seventh axes, respectively, and wherein the arm and said one of the first link and the second link nest with one another along the longitudinal lengths.

14. The carrier of claim 1 wherein the base is adapted to be coupled to a roof rack mounted to the vehicle.

15. The carrier of claim 14 wherein the roof rack comprises a crossbar extending along a sixth axis and wherein the second axis and the fourth axis at which the first link and the second link are pivotally coupled to the base, respectively, are located such that a plane intersecting both the first axis and the second axis extends greater than 90 degrees and less than 270 degrees with respect to the sixth axis.

16. The carrier of claim 15, wherein the plane extends between 250 degrees and 260 degrees with respect to the sixth axis.

17. The carrier of claim 16, wherein the plane preferably extends 255 degrees with respect to the sixth axis.

18. The carrier of claim 1, wherein the cargo holder moves between a raised position and at least one lowered position, wherein the cargo holder is biased towards the raised position and wherein the carrier includes a locking mechanism configured to releasably lock the cargo holder in the at least one lowered position.

19. The carrier of claim 18 further comprising:
a load assist having a first end pivotably coupled to the first link about a sixth axis and a second end; and
a rigid member pivotably coupled to the second end of the load assist about a seventh axis and pivotably coupled to the cargo holder about an eighth axis, wherein the shock and the seventh axis pivot about the eighth axis along an arc, wherein the seventh axis lies on a first side of a line intersecting the second axis and the eighth axis proximate the first link when the locking mechanism is in the locked position and wherein the seventh axis lies on a second side of the line intersecting the second axis and the eighth axis proximate the second link when the locking mechanism is in the released position.

20. The carrier of claim 18, wherein the locking mechanism actuates between a locked position and a released position.

21. The carrier of claim 20, wherein the locking mechanism pivots between the locked position and the released position.

22. The carrier of claim 20, wherein the locking mechanism comprises a handle configured to actuate the locking mechanism between the locked position and the released position.

23. The carrier of claim 1, wherein the cargo holder comprises:
a rigid arm having an arcuate portion configured to receive an elongate watercraft;
a hook extending from the arm on a first side of the arcuate portion;
an elongate flexible member having a first end and a second opposite end, wherein the first end is coupled to a second side of the arcuate portion; and
a rigid coupling member releasably received by the hook and rotatable about a sixth axis when received by the hook, wherein the second end of the elongate flexible member is eccentrically coupled to the coupling member relative to the sixth axis.

24. The carrier of claim 23 wherein the arm comprises an arcuate portion configured to support the cargo and a mounting portion configured to mount to a vehicle.

25. The carrier of claim 23, wherein the first end of the flexible member is movable between a plurality of arm attachment points along the arm.

26. The carrier of claim 25, wherein the arm includes a plurality of longitudinally spaced detents and wherein the first end includes at least one detent attachment surface movable between a detent engaging position and a detent disengaging position.

27. The carrier of claim 26, wherein the plurality of detents comprise teeth.

28. The carrier of claim 26, wherein the attachment surface flexes between the detent engaging position and the detent disengaging position.

29. A cargo carrier for use with a vehicle having a front, a rear, a first side, and a second side, the carrier comprising:
a base adapted to be mounted to the vehicle;
a cargo holder configured to be secured to cargo;
a first link having a first end pivotably coupled to the base about a first axis parallel to the first side and a second end pivotably coupled to the cargo holder about a second axis extending parallel to the first axis; and
a second link having a first end pivotably coupled to the base about a third axis extending parallel to the first axis and a second end pivotably coupled to the cargo holder about a fourth axis extending parallel to the first axis, wherein the cargo holder moves between a vertical raised position in which the cargo holder extends above the base in a first plane and a vertical lowered position in which the cargo holder extends at least partially below the base in a second plane parallel to or coextensive with the first plane;

wherein the cargo holder includes an arm and wherein the arm and one of the first link and the second link at least partially nest with one another.

30. The carrier of claim 29, wherein the arm and said one of the first link and the second link have longitudinal lengths extending along substantially parallel fifth and sixth axes, respectively, and wherein the arm and said one of the first link and the second link nest with one another along the longitudinal lengths.

31. The carrier of claim 29 herein the base is adapted to be coupled to a roof rack mounted to the vehicle.

32. The carrier of claim 29, wherein the cargo holder is biased towards the raised position and wherein the carrier includes a locking mechanism configured to releasably lock the cargo holder in the at least one lowered position.

33. The carrier of claim 32, wherein the locking mechanism actuates between a locked position and a released position.

34. A cargo carrier for use with a vehicle having a front, a rear, a first side, and a second side, the carrier comprising:
    a base adapted to be mounted to the vehicle;
    a cargo holder configured to be secured to cargo;
    a first link having a first end pivotably coupled to the base about a first axis parallel to the first side and a second end pivotably coupled to the cargo holder about a second axis extending parallel to the first axis;
    a second link having a first end pivotably coupled to the base about a third axis extending parallel to the first axis and a second end pivotably coupled to the cargo holder about a fourth axis extending parallel to the first axis, wherein the cargo holder moves between a vertical raised position in which the cargo holder extends above the base in a first plane and a vertical lowered position in which the cargo holder extends at least partially below the base in a second plane parallel to or coextensive with the first plane;
    a locking mechanism configured to releasably lock the cargo holder in the lowered position, wherein the locking mechanism actuates between a locked position and a released position;
    a load assist having a first end pivotably coupled to the first link about a fifth axis and a second end wherein the cargo holder is biased towards the raised position; and
    a rigid member pivotably coupled to the second end of the load assist about a sixth axis and pivotably coupled to the cargo holder about a seventh axis, wherein the load assist and the sixth axis pivot about the seventh axis along an arc, wherein the sixth axis lies on a first side of a line intersecting the first axis and the seventh axis proximate the first link when the locking mechanism is in the locked position and wherein the sixth axis lies on a second side of the line intersecting the first axis and the seventh axis proximate the second link when the locking mechanism is in the released position.

35. The carrier of claim 34 wherein the base is adapted to be pivotably coupled to the roof rack about a fifth axis extending parallel to the first side.

36. The carrier of claim 34, wherein the locking mechanism pivots between the locked position and the released position.

37. The carrier of claim 34, wherein the locking mechanism comprises a handle configured to actuate the locking mechanism between the locked position and the released position.

38. The carrier of claim 34 wherein the base is adapted to be coupled to a roof rack mounted to the vehicle.

39. A cargo carrier for use with a vehicle having a front, a rear, a first side, and a second side, the carrier comprising:
    a base adapted to be coupled to the vehicle;
    a cargo holder configured to be secured to cargo, the cargo holder including:
        a rigid arm having an arcuate portion configured to receive an elongate watercraft;
        an elongate flexible member having a first end coupled to the arm on a first side of the arcuate portion and a second end coupled to the arm on a second opposite side of the arcuate portion; and
    a first link having a first end pivotably coupled to the base about a first axis extending parallel to the first side and a second end pivotably coupled to the cargo holder about a second axis extending parallel to the first axis, wherein the cargo holder moves between a vertical raised position in which the cargo holder extends above the base in a first plane and a vertical lowered position in which the cargo holder extends at least partially below the base in a second plane parallel to or coextensive with the first plane.

40. The carrier of claim 39, wherein the cargo holder has an arcuate portion including a concave surface and wherein the cargo holder pivots about the second axis between a load position in which the concave surface generally faces upwards and a stow position in which the concave surface generally faces downwards.

41. The carrier of claim 39 wherein the base is adapted to be coupled to a roof rack mounted to the vehicle.

42. The carrier of claim 39, further comprising a second link having a first end pivotably coupled to the base about a third axis extending parallel to the first axis and a second end pivotably coupled to the cargo holder about a fourth axis extending parallel to the first axis.

43. The carrier of claim 42, wherein the base is adapted to be pivotably coupled to the roof rack about a fifth axis extending parallel to the first axis.

44. The carrier of claim 39 further comprising a shock having a first end pivotably coupled to the base and a second end pivotably coupled to the first link, wherein the shock biases the first link towards the vertical raised position.

45. The carrier of claim 44, wherein the shock comprises a gas shock.

46. A cargo carrier for use with a vehicle having a front, a rear, a first side, and a second side, the carrier comprising:
    a cargo holder configured to be coupled to the vehicle, the cargo holder including:
        a rigid arm having an arcuate portion configured to receive an elongate watercraft;
        a flexible support having a first portion, a second opposite portion and an intermediate portion between the first portion and the second portion, wherein the first portion is coupled to a first side of the arcuate portion, wherein the second portion is coupled to a second side of the arcuate portion and wherein the intermediate portion is spaced above the arm and is adapted to support the elongate watercraft at a distance spaced above the arm such that a gap extends between the arm and the intermediate portion; and
        an elongate flexible member having a first end and a second end, wherein the first end is coupled to a first side of the arcuate portion and wherein the second end is coupled to a second side of the arcuate portion, wherein the flexible member and the flexible support are configured such that the elongate watercraft is sandwiched therebetween.

47. The carrier of claim 46, wherein the cargo holder moves between a vertical raised position in which the cargo holder extends above the vehicle in a first plane and a vertical lowered position in which the cargo holder extends in a second plane parallel to or coextensive with the first plane and a t least partially below the first plane.

48. The carrier of claim 46, wherein the cargo holder moves between a horizontal stowed position and a vertical loading position.

49. The carrier of claim 46 wherein the base is adapted to be coupled to a roof rack mounted to the vehicle.

50. The carrier of claim 46 further comprising:
a hook extending from the arm on the first side of the arcuate portion; and
a rigid coupling member releasably received by the hook and rotatable about an axis when received by the hook, wherein the second end of the elongate flexible member is eccentrically coupled to the coupling member relative to the axis.

51. The carrier of claim 50 further comprising a releasably locking mechanism for locking at least one of the first and second ends of the elongate flexible member in place relative to the arm.

52. The carrier of claim 51, wherein the locking mechanism releasably locks the hook and the coupling member to one another.

53. The carrier of claim 46, wherein the first end of the flexible member is movable between a plurality of arm attachment points along the arm.

54. The carrier of claim 53, wherein the arm comprises a plurality of longitudinally spaced detents and wherein the first end includes at least one detent attachment surface movable between a detent engaging position and a detent disengaging position.

55. The carrier of claim 54, wherein the first end comprises a rigid coupling member that flexes between a detent engaging position and a detent disengaging position.

56. The carrier of claim 46, wherein the cargo holder is configured to be movably coupled relative to the vehicle.

57. The carrier of claim 56, wherein the cargo holder is configured to be moved between a raised position in which the cargo holder extends at least partially above the and a lowered position in which the cargo holder extends at least partially below a top of the vehicle.

58. The carrier of claim 57 including:
a base adapted to be coupled to the vehicle; and
a first link having a first end pivotably coupled to the base about the first axis extending parallel to the first side and a second end pivotably coupled to the cargo holder about a second axis extending parallel to the first axis.

59. The carrier of claim 58 further comprising a second link having a first end pivotably coupled to the base about a third axis extending parallel to the first axis and a second end pivotably coupled to the cargo holder about a fourth axis extending parallel to the first axis.

60. The carrier of claim 58, wherein the base is adapted to be pivotably coupled to the roof rack about a fifth axis extending parallel to the first axis.

61. A cargo carrier for use with a vehicle having a front, a rear, a first side, and a second side, the carrier comprising:
a base adapted to be coupled to the vehicle;
a cargo holder coupled to the base and configured to be secured to cargo, wherein the cargo holder is configured to move between a raised position and at least one lowered position, wherein the cargo holder is biased towards the raised position; and
a locking mechanism configured to releasably lock the cargo holder in the at least one lowered position;
a first link having a first end pivotably coupled to the base about a first axis and a second end pivotably coupled to the cargo holder about a second axis extending parallel to the first axis;
a second link having a first end pivotably coupled to the base about a third axis and a second end pivotably coupled to the cargo holder about a fourth axis extending parallel to the first axis; and
a load assist having a first end pivotably coupled to the first link and a second end;
wherein the locking member includes a rigid member pivotably coupled to the load assist about a fifth axis and pivotably coupled to the cargo holder about a sixth axis, wherein the load assist biases the cargo holder towards the raised position and wherein the load assist and the fifth axis pivot about the sixth axis between a locked position and a released position.

62. The carrier of claim 61, wherein the load and the fifth axis pivot about the sixth axis along an arc, wherein the sixth axis lies on a first side of a line intersecting the fifth axis and the first axis proximate the first link when the locking member is in the locked position and wherein the sixth axis lies on a second side of the line intersecting the fifth axis and the first axis proximate the second link when the locking member is in the released position.

63. The carrier of claim 61 wherein the base is adapted to be coupled to a roof rack mounted to the vehicle.

64. The carrier of claim 61, wherein the locking mechanism actuates between a locked position and a released position.

65. The carrier of claim 64, wherein the locking mechanism pivots between the locked position and the released position.

66. The carrier of claim 64, wherein the locking mechanism comprises a handle configure to actuate the locking mechanism between the locked position and the released position.

* * * * *